US009832089B2

(12) United States Patent
Zinevich

(10) Patent No.: US 9,832,089 B2
(45) Date of Patent: Nov. 28, 2017

(54) DETECTING LEAKAGE OF OFDM SIGNALS FROM AN HFC NETWORK

(71) Applicant: ARCOM DIGITAL, LLC, Syracuse, NY (US)

(72) Inventor: Victor M. Zinevich, Voronezh (RU)

(73) Assignee: ARCOM DIGITAL, LLC, Syracuse, NY (US)

( * ) Notice: Subject to any disclaimer, the term of this patent is extended or adjusted under 35 U.S.C. 154(b) by 213 days.

(21) Appl. No.: 14/936,551

(22) Filed: Nov. 9, 2015

(65) Prior Publication Data
US 2016/0197804 A1   Jul. 7, 2016

Related U.S. Application Data

(60) Provisional application No. 62/100,877, filed on Jan. 7, 2015.

(51) Int. Cl.
| | |
|---|---|
| *H04L 12/26* | (2006.01) |
| *H04L 27/26* | (2006.01) |
| *H04B 3/46* | (2015.01) |
| *H04L 1/20* | (2006.01) |

(52) U.S. Cl.
CPC ............... *H04L 43/08* (2013.01); *H04B 3/46* (2013.01); *H04L 27/2601* (2013.01); *H04L 1/206* (2013.01)

(58) Field of Classification Search
CPC ................................. H04N 17/00; H04L 43/08
See application file for complete search history.

(56) References Cited

U.S. PATENT DOCUMENTS

| | | |
|---|---|---|
| 4,072,899 A | 2/1978 | Shimp |
| 6,018,358 A | 1/2000 | Bush |
| 6,600,515 B2 | 7/2003 | Bowyer et al. |
| (Continued) | | |

FOREIGN PATENT DOCUMENTS

| | | |
|---|---|---|
| WO | WO2000013424 A1 | 3/2000 |
| WO | WO2013003301 A1 | 1/2013 |

OTHER PUBLICATIONS

European Patent Office, International Search Report on counterpart PCT Application No. PCT/US2015/064222, Pub. No. WO2016/111786 (dated Jul. 14, 2016), entitled Detecting Leakage of OFDM Signals from an HFC Network, dated Mar. 15, 2016, pp. 1-4, published by World Intellectual Property Organization (WIPO), Geneva, Switzerland.

(Continued)

*Primary Examiner* — Kevin C Harper
(74) *Attorney, Agent, or Firm* — Lawrence P. Trapani, Esq.

(57) ABSTRACT

Detecting a leak of an OFDM signal from an HFC network, where the HFC network extends over a network area. The OFDM signal includes a first continuous pilot subcarrier having a first harmonic. The first harmonic is defined by a pre-determined first frequency. The method or apparatus comprises the steps of or means for: (a) moving a leakage detector through the network area; (b) tuning the leakage detector to receive the first harmonic of the OFDM signal, based on the pre-determined first frequency of the first harmonic; (c) with the leakage detector, receiving over-the-air, at a received first frequency, the first harmonic of the OFDM signal leaked from the HFC network; and (d) with the leakage detector, detecting the first harmonic received in step (c), whereby the leak of the OFDM signal is detected based on the detection of the first harmonic.

22 Claims, 24 Drawing Sheets

(56) References Cited

U.S. PATENT DOCUMENTS

| | | | |
|---|---|---|---|
| 6,804,826 | B1 | 10/2004 | Bush et al. |
| 7,250,772 | B2 | 7/2007 | Furse et al. |
| 7,415,367 | B2 | 8/2008 | Williams |
| 7,664,187 | B2 | 2/2010 | Chan et al. |
| 8,233,862 | B2 | 7/2012 | Gaddam et al. |
| 8,456,530 | B2 | 6/2013 | Zinevich |
| 8,605,806 | B2 | 12/2013 | Krishnan et al. |
| 8,749,248 | B2 | 6/2014 | Murphy et al. |
| 8,856,850 | B2 | 10/2014 | Sala et al. |
| 8,867,561 | B2 | 10/2014 | Urban et al. |
| 8,904,460 | B2 | 12/2014 | Zinevich |
| 9,106,886 | B2 | 8/2015 | Bush et al. |
| 9,112,762 | B2 | 8/2015 | Murphy |
| 9,160,407 | B2 | 10/2015 | Stelle, IV |
| 9,167,460 | B2 | 10/2015 | Bernard et al. |
| 9,374,291 | B2 | 6/2016 | Murphy |
| 2002/0101918 | A1 | 8/2002 | Rodman et al. |
| 2005/0034170 | A1 | 2/2005 | Bush et al. |
| 2006/0094943 | A1 | 5/2006 | Van Slyke |
| 2008/0220723 | A1 | 9/2008 | Krishnamoorthi et al. |
| 2009/0316634 | A1 | 12/2009 | Sahara |
| 2011/0267474 | A1 | 11/2011 | Sala et al. |
| 2012/0042213 | A1 | 2/2012 | Zimmerman |
| 2012/0086865 | A1 | 4/2012 | Bush et al. |
| 2012/0257661 | A1 | 10/2012 | Murphy et al. |
| 2013/0291044 | A1 | 10/2013 | Zinevich |
| 2013/0322569 | A1 | 12/2013 | Murphy et al. |
| 2014/0036975 | A1 | 2/2014 | Wolcott et al. |
| 2014/0105251 | A1 | 4/2014 | Bouchard |
| 2014/0146864 | A1 | 5/2014 | Stelle, IV et al. |
| 2014/0254407 | A1 | 9/2014 | Williams |
| 2014/0294052 | A1 | 10/2014 | Currivan et al. |
| 2015/0003226 | A1 | 1/2015 | Bernard et al. |
| 2015/0341810 | A1 | 11/2015 | Murphy |
| 2015/0381468 | A1 | 12/2015 | Murphy |
| 2016/0036492 | A1 | 2/2016 | Williams et al. |
| 2016/0112734 | A1 | 4/2016 | Williams et al. |

OTHER PUBLICATIONS

European Patent Office, Written Opinion of International Searching Authority, on counterpart PCT Application No. PCT/US2015/064222, Pub. No. WO2016/111786 (Jul. 14, 2016), entitled Detecting Leakage of OFDM Signals from an HFC Network, dated Mar. 15, 2016, pp. 1-5, published by World Intellectual Property Organization (WIPO), Geneva, Switzerland.

European Patent Office, International Search Report on PCT Application No. PCT/US2015/050568, Pub. No. WO2016/044518 (Mar. 24, 2016), entitled Detecting Leakage of OFDM Signals from an HFC Network, dated Jan. 8, 2016, pp. 1-4, published by World Intellectual Property Organization (WIPO), Geneva, Switzerland.

European Patent Office, Written Opinion of International Searching Authority, on PCT Application No. PCT/US2015/050568, Pub. No. WO2016/044518 (Mar. 24, 2016), entitled Detecting Leakage of OFDM Signals from an HFC Network, dated Jan. 8, 2016, pp. 1-8, published by World Intellectual Property Organization (WIPO), Geneva, Switzerland.

Shi, Zhenguo, et al., Improved Spectrum Sensing for OFDM Cognitive Radio in the Presence of Timing Offset, EURASIP Journal on Wireless Communications and Networking, Dec. 19, 2014, pp. 1-9, 2014:224, Springer, Germany/London.

Cable Television Laboratories, Inc. (CABLELABS®), Data-Over-Cable Service Interface Specifications DOCSIS® 3.1, Physical Layer Specification, CM-SP-PHYv3.1-I03-140610, Oct. 23, 2013 & Jun. 10, 2014, pp. 116-119, 134, 143-145, 158-162, 166-169, & 182-186, Rev.103, CableLabs®, Louisville, CO.

Tripathi, Monika, Study of Spectrum Sensing Techniques for OFDM-Based Cognitive Radio, Recent Trends in Electronics & Communication Systems, Jan. 1, 2014, pp. 25-31 (pp. 28 & 30), vol. 1, Issue I, STM Journals, India.

Lu, Lu, et al., Ten Years of Research in Spectrum Sensing and Sharing in Cognitive Radio, EURASIP Journal on Wireless Communications and Networking, Jan. 31, 2012, pp. 1-16, 2012:28, Springer, Germany/London.

Bokharaiee, Simin et al., Blind Spectrum Sensing for OFDM-Based Cognitive Radio Systems, IEEE Transactions on Vehicular Technology, Mar. 2011, pp. 858-871, vol. 60, No. 3, New York, NY.

Akyildiz, Ian F., et al., Cooperative Spectrum Sensing in Cognitive Radio Networks: A Survey, Physical Communication, Dec. 19, 2010, pp. 40-62 (pp. 40-43 & 46), vol. 4, Issue 1, Mar. 2011, Elsevier, BV, Amsterdam, Netherlands.

Yucek, Tevrik et al., A Survey of Spectrum Sensing Algorithms for Cognitive Radio Applications, IEEE Communications Surveys & Tutorials, Jan. 1, 2009, pp. 116-130, vol. 11, No. 1, First Quarter 2009, New York, NY.

Agilent Technologies, Flexible OFDM Signal Generation, Analysis and Troubleshooting, Aerospace and Defense Symposium 2011, Apr. 13, 2011, pp. 1-70 (pp. 44-65), Agilent Technologies, Santa Clara, CA; http://www.keysight.com/upload/cmc_upload/All/2_Flexible_OFDM_Signal_Generation_Analysis_and_Troubleshooting.pdf?cmpid=1-3660333773&cc=US&lc=eng.

Agilent Technologies, Flexible OFDM Signal Generation, Analysis and Troubleshooting, Aerospace and Defense Symposium 2011, Apr. 13, 2011, pp. 1-70 (pp. 44-65), Agilent Technologies, Santa Clara, CA; http://www.keysight.com/upload/cmc_upload/A11/2_Flexible_OFDM_Signal_Generation_Analysis_and_Troubleshooting.pdf? cmpid=1-3660333773&cc=US&lc=eng.

PLC PREAMBLE BPSK MATRIX FOR 4K FFT MODE:

|  | Symbol 1 | Symbol 2 | Symbol 3 | Symbol 4 | Symbol 5 | Symbol 6 | Symbol 7 | Symbol 8 |
|---|---|---|---|---|---|---|---|---|
| Subcarrier 1 | 0 | 0 | 1 | 0 | 1 | 1 | 0 | 1 |
| Subcarrier 2 | 1 | 0 | 0 | 0 | 1 | 1 | 1 | 0 |
| Subcarrier 3 | 0 | 1 | 1 | 1 | 1 | 0 | 0 | 1 |
| Subcarrier 4 | 0 | 1 | 0 | 0 | 0 | 1 | 1 | 0 |
| Subcarrier 5 | 1 | 1 | 1 | 0 | 1 | 1 | 1 | 1 |
| Subcarrier 6 | 1 | 0 | 0 | 0 | 0 | 0 | 0 | 1 |
| Subcarrier 7 | 0 | 1 | 0 | 1 | 0 | 0 | 1 | 1 |
| Subcarrier 8 | 0 | 0 | 1 | 0 | 0 | 0 | 1 | 1 |

AUTO-CORRELATION FUNCTION:

PLC PREAMBLE BPSK MATRIX FOR 8K FFT MODE:

|  | Symbol 1 | Symbol 2 | Symbol 3 | Symbol 4 | Symbol 5 | Symbol 6 | Symbol 7 | Symbol 8 |
|---|---|---|---|---|---|---|---|---|
| Subcarrier 1 | 1 | 0 | 0 | 1 | 0 | 1 | 0 | 0 |
| Subcarrier 2 | 0 | 1 | 1 | 0 | 0 | 1 | 0 | 0 |
| Subcarrier 3 | 0 | 1 | 1 | 1 | 0 | 0 | 0 | 1 |
| Subcarrier 4 | 0 | 0 | 0 | 1 | 0 | 1 | 1 | 1 |
| Subcarrier 5 | 1 | 1 | 0 | 0 | 1 | 0 | 1 | 0 |
| Subcarrier 6 | 0 | 0 | 0 | 1 | 1 | 0 | 0 | 1 |
| Subcarrier 7 | 0 | 1 | 1 | 1 | 0 | 1 | 1 | 0 |
| Subcarrier 8 | 1 | 1 | 1 | 0 | 0 | 0 | 1 | 0 |
| Subcarrier 9 | 0 | 1 | 1 | 1 | 1 | 0 | 0 | 1 |
| Subcarrier 10 | 1 | 1 | 1 | 1 | 0 | 1 | 1 | 1 |
| Subcarrier 11 | 1 | 1 | 1 | 0 | 0 | 0 | 0 | 0 |
| Subcarrier 12 | 1 | 1 | 0 | 1 | 0 | 1 | 0 | 1 |
| Subcarrier 13 | 1 | 1 | 0 | 0 | 1 | 1 | 0 | 0 |
| Subcarrier 14 | 1 | 0 | 1 | 1 | 1 | 0 | 1 | 0 |
| Subcarrier 15 | 0 | 1 | 0 | 1 | 1 | 0 | 0 | 0 |
| Subcarrier 16 | 0 | 0 | 1 | 0 | 0 | 0 | 0 | 1 |

AUTO-CORRELATION FUNCTION:

Auto-Correlation Function of Predefined Continuous
Pilots within PLC Preamble Time Interval for 8K (±350 μsec.)

Auto-Correlation Function of Predefined Continuous
Pilots within PLC Preamble Time Interval for 8K (±50 μsec.)

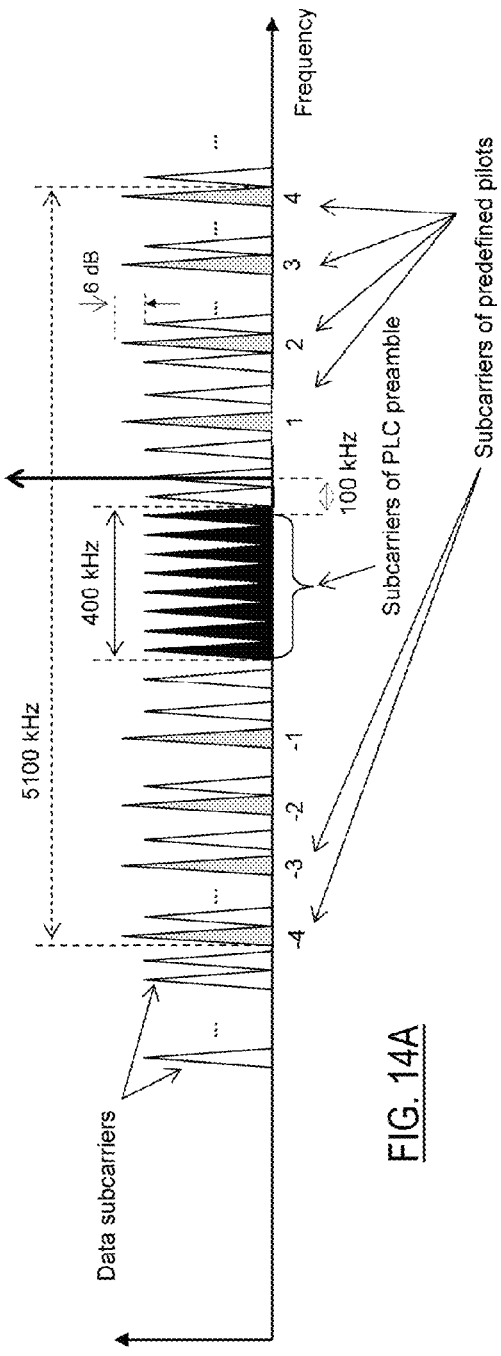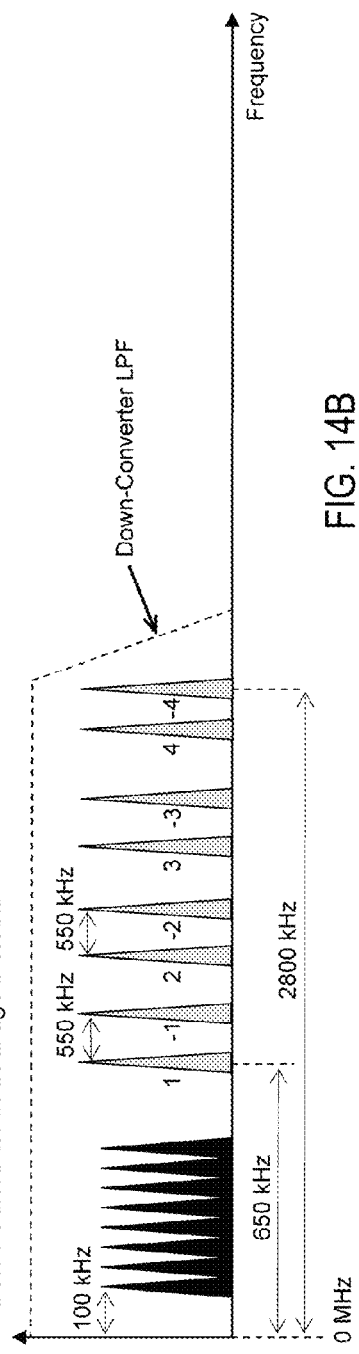

DETECTING LEAKAGE OF OFDM SIGNALS FROM AN HFC NETWORK

CROSS-REFERENCE TO RELATED APPLICATIONS

This application claims the benefit of U.S. Provisional Application No. 62/100,877, filed Jan. 7, 2015, which is incorporated herein by reference. This application is related in subject matter to co-pending application Ser. No. 14/855,643, filed Sep. 16, 2015, naming the same inventor.

BACKGROUND OF THE INVENTION

Field of Invention

The present invention relates generally to the detection of signal leakage from a Hybrid Fiber-Coax (HFC) network, and more particularly to a method and system for detecting leakage of orthogonal frequency division multiplexing (OFDM) signals and locating the source of the leak in a modern HFC network having a Converged Cable Access Platform (CCAP) architecture.

Background Art

The task of detecting leakage from a coaxial cable part of an HFC network is important for preventing interfering signals emitted from the HFC network ("egress") at aeronautical and long term evolution (LTE) bands and also for preventing interfering signals from entering the HFC network ("ingress"). The leakage detection in a modern HFC network with a CCAP architecture presents challenges, primarily because of two factors. The first is the aggressive migration from analog to digital signals, such as QAM signals. A QAM signal looks like noise, which creates difficulties in detecting this type of signal by traditional, narrowband analog leakage detectors. Another type of digital signal, introduced under the Data-Over-Cable Service Interface Specifications (DOCSIS) 3.1 specification, published by Cable Television Laboratories, Inc. (CableLabs®) of Louisville, Colo., is a wideband (up to 192 MHz) OFDM signal. The OFDM signal also looks like noise and its detection, e.g., by a sensitive spectrum analyzer, is even more complicated than a QAM signal, because the OFDM signal does not have a 6 MHz haystack spectrum shape (as does the QAM signal).

The second factor making leakage detection in a modern HFC network a challenge is the structure and operation of the CCAP architecture being adopted for such networks. There are many aspects of CCAP architectures, but, from the point of view of detecting radio frequency (RF) leakage, the focus is on the aspect of increasing the number of narrowcast channels (SDV, VOD, DOCSIS, etc.) and forming a full spectrum of downstream channels at a single RF port of a Cable Modem Termination System (CMTS) card, for only a group of nodes or even a single node. In other words, the RF signal spectrum is becoming more unique at each node or group of nodes and this presents greater difficulties for valid detection of RF leakage throughout the HFC network.

The known methods of detecting leakage of digital signals in an HFC network can be divided into three main groups. The first group includes the traditional spectrum analyzer method. This method is universal for detection of any RF signal, but it is not sensitive enough for noise-like, low level QAM and OFDM signals, and there is the difficulty in identifying the particular HFC network (e.g., in an overbuilt scenario) from which the leaked signal came. Also, the cost of such equipment can be relatively high. Further, this method requires a human operator for analysis of the signals. Thus, it is not suitable for an automatic patrolling mode of leakage detection.

The second group of leakage detection methods is based on the injection into the HFC network of some predefined pilot or test signal with specific tag information modulated thereon (i.e., "tag signal"). This group has been well-known for many years and was widely used for detecting leakage of analog signals. Examples of this group are found in the following patents: U.S. Pat. No. 6,600,515 to Bowyer et al.; and U.S. Pat. No. 4,072,899 to Shimp. The use of tag or pilot signals in connection with analog TV signals are disclosed in the following patents: U.S. Pat. No. 6,804,826 to Bush et al.; U.S. Pat. No. 6,600,515 to Bowyer et al.; and U.S. Pat. No. 6,018,358 to Bush. These patents are primarily concerned with analog leakage signal detection, but can be used for digital leakage detection if an unoccupied channel or gap in the HFC spectrum is allocated for the tag or pilot signal (preferably near a digital channel). So, in general, the use of tag and pilot signals in an HFC network is well-known in RF engineering practice.

The first publication, to the Inventor's knowledge, of the idea of injecting a CW pilot carrier into a guard band between two adjacent QAM channels in an all-digital HFC network is a Polish Patent App. No. P.391095, filed Apr. 29, 2010 and a corresponding U.S. Pub. Patent App. No. 2011/0267474 (Nov. 3, 2011), filed Dec. 15, 2010 (by KABELKOM SP.). Similar concepts are also disclosed in the following patent documents: U.S. Pat. No. 8,749,248 (Jun. 10, 2014); and PCT Pub. App. WO 2013003301 (Jan. 3, 2013). In some disclosed embodiments, two CW carriers with a frequency off-set therebetween are used as a composite tag signal.

Another variant of injecting a pilot signal between adjacent QAM channels uses a spread spectrum BPSK modulated pilot signal placed in the guard bands between the QAM channels. This system is described in U.S. Pub. Patent App. 2014/0105251 (Apr. 17, 2014). Using a spread spectrum pilot purportedly makes the detection of the pilot signal more robust. However, the spread spectrum receiver used to accomplish the detection is more complex than a simple FFT receiver used to detect CW pilots in the other solutions.

The main disadvantage of all of the above pilot signal methods is that extra signals must be injected into the HFC network. So, there is a potential risk of the pilot signals interfering with the network's normal commercial signal traffic. In the case of using OFDM signals in an HFC network, the injection of any additional pilot signals may have an impact on the efficiency of data transmission. Also, in a modern HFC network with a CCAP architecture, physically combining any pilot signal with the downstream spectrum, formed at one RF port of a CMTS card for one or small group of nodes, is not trivial and may not even be possible, especially in the case of Fiber Deep systems proposed by Aurora Networks, Santa Clara, Calif. (www.aurora.com).

A third approach to detecting digital signal leakage is based on a coherent cross-correlation method described in U.S. Pat. No. 8,456,530, issued to the Inventor herein. A commercial embodiment of such a method is supplied by ARCOM DIGITAL, LLC, Syracuse, N.Y., under the brand name QAM Snare®. This method is based on the steps: (1) sampling the downstream digital signals at the headend under synchronization of a stable GPS clock; (2) transmitting those samples to a field leakage detector via a wireless IP network; and (3) coherently cross-correlating those samples with samples of a received over-the-air leakage signal. The leakage signal is detected under noisy conditions from a cross-correlation peak resulting from the cross-correlation. The advantage of this method is that there is no need to inject a tag or pilot signal into the HFC network. Also, this method works and is compatible with any noise-like digital signal, such as a QAM or OFDM signal.

Another advantage of the coherent cross-correlation method is that it allows one to measure the time delay of the QAM or OFDM signal from the headend to the leakage detector, and then to use this time delay to determine a location of the leak in the HFC network. The location may be determined by using a Time Difference of Arrival (TDOA) algorithm or predetermined time delays of network devices in the HFC network under test, where the time delays are stored in a network database ("network database method"). Again, refer to the Inventor's earlier patent, U.S. Pat. No. 8,456,530, which is incorporated herein by reference. A limitation (in some circumstances) of the coherent cross-correlation method is that equipment for sampling the downstream digital signal is installed at the headend (or other suitable reference point in the network), and that such a method is most suited for detecting leakage of broadcast channel signals. As indicated above, a trend in modern HFC networks with a CCAP architecture is to reduce the number of broadcast channels, and the adoption of wideband OFDM signals may exacerbate the problem. Because OFDM modulation is more robust than QAM signals in the face of network impairments in the forward path, and due to better efficiencies in data transmission, it is likely that OFDM signals will gradually displace the current QAM channels signals in HFC networks and occupy the forward path spectrum more and more.

A non-coherent cross-correlation method for detecting leakage of a QAM signal has been proposed in U.S. Pub. Patent App. 2013/0322569 (Dec. 5, 2013). The QAM signal is detected by detecting a spectral component of a received signal that corresponds to a known QAM symbol rate used in the HFC network under test. It is believed that this approach is akin to detecting QAM leakage signals using a spectrum analyzer.

A potential problem inherent to known cross-correlation methods is that a physical connection to a large number of RF ports at multiple CMTS's (in a CCAP architecture), for sampling the downstream OFDM signals, may become increasingly difficult, and it may even become impossible with a migration of CCAP to a Fiber Deep architecture. Another potential problem with known cross-correlation methods is that they may require a continuous wireless connection for transmission of reference signal samples from the headend (or other reference point) to the leakage detector in the field. There are still places where wireless communication is not reliable.

In light of the above discussion, it becomes clear that modern HFC networks employing CCAP architecture and transmitting OFDM signals present new challenges to cable operators in detecting and locating leakage of HFC network signals. It should be noted that challenges associated with detecting OFDM signals also exists in "Cognitive radio" and "Spectrum sensing" wireless communication systems. Using those terms in a Google® search will yield a number of articles, books, patents, and other references on this subject. See for example: Shi et al., Improved Spectrum Sensing for OFDM Cognitive Radio in the Presence of Timing Offset, pp. 1-9, 19 Dec. 2014, EURASIP Journal on Wireless Communications and Networking, Vol. 2014, Issue 224; Tripathi, Study of Spectrum Sensing Techniques for OFDM Based Cognitive Radio, pp. 4-8, August 2014, International Journal of Technology Enhancements and Emerging Engineering Research, Vol. 2, Issue 8; Lu et al., Ten Years of Research in Spectrum Sensing and Sharing in Cognitive Radio, pp. 1-16, 31 Jan. 2012, EURASIP Journal on Wireless Communications and Networking, Vol. 2012, Issue 28; Bokharaiee et al., Blind Spectrum Sensing for OFDM-Based Cognitive Radio Systems, pp. 858-71, March 2011, IEEE Transactions on Vehicular Technology, Vol. 60, No. 3, IEEE; Akyildiz et al., Cooperative Spectrum Sensing in Cognitive Radio Networks: A Survey, pp. 40-62, 19 Dec. 2010, Physical Communication, Vol. 2011, Issue 4, Elsevier B.V.; and Yiicek et al., A Survey of Spectrum Sensing Algorithms for Cognitive Radio Applications, pp. 116-30, February 2009, IEEE Communications Surveys & Tutorials, Vol. 11, No. 1, First Quarter 2009, IEEE. It is believed that such references concern detection of OFDM signals for wireless communication applications and do not take into account the specifics of an OFDM signal leaking from a coaxial cable part of an HFC network with CCAP architecture. Thus, the known methods of detecting OFDM signals are not directly applicable to solving the above-discussed problems with modern HFC networks employing a CCAP architecture and transmitting OFDM signals.

OBJECTS AND SUMMARY OF THE INVENTION

It is therefore an object of the present invention to provide a method and system for detecting leakage of OFDM signals in an HFC network with a CCAP architecture that overcomes the problems associated with the prior art.

It is another object of the present invention to provide a method of detecting leakage of OFDM signals in an HFC network based on known parameters of the OFDM signals and based on signatures determined from the known parameters, such that sampling of OFDM signals at the headend (or other point) and transmitting the sampling results to a field leakage detector is not required.

It is further object of the present invention to provide a signature of an OFDM signal ("OFDM signature") for detection of leakage of the OFDM signal from an HFC network, where the signature includes a harmonic or harmonics of one or more continuous pilot subcarriers ("CPSs") of the OFDM signal.

It is still another object of the present invention to provide a method of utilizing a plurality of OFDM signatures associated with a plurality of CMTS-serviced areas, respectively, including selecting one of the signatures based on the area in which leakage detection is to be performed.

It is still a further object of the present invention to provide a method of detecting leakage of an OFDM signal in an HFC network by detecting a harmonic or harmonics of one or more CPSs of the OFDM signal.

It is yet another object of the present invention to provide a method of validating or confirming detection of leakage of an OFDM signal in an HFC network.

It is yet a further object of the present invention to provide a system for detecting leakage of OFDM signals in an HFC network with CCAP architecture.

These and other objects are attained in accordance with the present invention, wherein there are provided methods and apparatus for detecting OFDM signals leaking from a modern HFC network having a CCAP architecture. The methods and apparatus include creating signatures of different OFDM signals transmitted to different CMTS-serviced areas. In at least one embodiment, the signatures are constructed or calculated in a leakage data server and then transmitted to a field leakage detector via an IP wireless network. In the latter embodiment, the server calculates signatures based on parameters of the OFDM signal, which are periodically pulled from CMTS's via SNMP protocol. The leakage detector adaptively selects the signatures depending on the current location of the unit (as determined by GPS) and information about the boundaries or locations of predefined areas (e.g., hubs and nodes) served by the different CMTS's. The leakage detector includes a receiver that samples the OFDM leakage signal. The spectrum of the sampled leakage signal is then created and analyzed for the presence of a harmonic of a particular CPS (of the OFDM leakage signal) identified in the selected signature. The presence of such a harmonic indicates the detection of the OFDM leakage signal, and the level of the harmonic is related to the level of the leakage signal. A validation step or steps may be performed to confirm detection of the harmonic.

One embodiment of the present invention ("the CPS embodiment") concerns a method of detecting and locating a leak of an OFDM signal in an HFC network having a CCAP architecture. The leak of the OFDM signal is in a particular CMTS service area of the HFC network ("current service area"), among a plurality of CMTS service areas. The OFDM signal contains a plurality of continuous pilot subcarriers (CPS's) and a plurality dominant harmonics associated with the CPS's, respectively. The method comprises the steps of: (a) providing a leakage detector containing stored therein a CPS signature and geographic coordinates for each of the plurality of CMTS service areas, where the CPS signature for the current CMTS service area identifies an RF frequency and a relative level of the dominant harmonic of each CPS contained in the OFDM signal; (b) moving the leakage detector through the HFC network, along a route that traverses the plurality of CMTS service areas; (c) obtaining a geographic position of the leakage detector as the leakage detector moves through the current CMTS service area and identifying the current CMTS service area based on the geographic position of the leakage detector and the geographic coordinates of the plurality of CMTS service areas; (d) selecting from the stored CPS signatures the CPS signature for the current CMTS service area; (e) identifying from the selected CPS signature a first CPS and an RF frequency of the dominant harmonic of the first CPS; (f) tuning the leakage detector to receive the dominant harmonic of the first CPS based on the RF frequency identified in step (e); (g) receiving at the leakage detector the OFDM signal leaked from the current CMTS service area, including the dominant harmonic of the first CPS; (h) detecting and measuring the level of the dominant harmonic of the first CPS from the OFDM signal received in step (g); and (i) calculating the level of the OFDM signal leaked from the current CMTS service area based on the level of the dominant harmonic measured in step (h) and on the relative level of the dominant harmonic obtained from the selected CPS signature.

The CPS embodiment may further provide steps for confirming that the detected dominant harmonic of the first CPS is from the OFDM signal leaked from the current CMTS service area. The further steps comprise: (j) identifying from the CPS signature selected in step (d) a second CPS and an RF frequency of the dominant harmonic of the second CPS, where the CPS signature selected in step (d) further identifies a calculated frequency offset between the dominant harmonic of the first CPS and the dominant harmonic of the second CPS; (k) tuning the leakage detector to receive the dominant harmonic of the second CPS based on the RF frequency identified in step (j); (l) receiving at the leakage detector the OFDM signal leaked from the current CMTS service area, including the dominant harmonic of the second CPS; (m) detecting the dominant harmonic of the second CPS from the OFDM signal received in step (l); (n) determining a frequency offset between the detected dominant harmonic of the first CPS and the detected dominant harmonic of the second CPS; and (o) confirming that the detected dominant harmonic of the first CPS is from the OFDM signal leaked from the current CMTS service area if the frequency offset determined in step (n) is substantially the same as the calculated frequency offset obtained from the CPS signature selected in step (d).

BRIEF DESCRIPTION OF THE DRAWING

Further objects of the present invention will become apparent from the following description of a preferred embodiment with reference to the accompanying drawing, in which:

FIG. 14A is a frequency spectrum representation of an RF OFDM signal, in the 4K FFT mode, illustrating subcarriers of the signal and a specification of an LO carrier frequency for use in down-converting the OFDM signal in a digital leakage receiver;

FIG. 14B is a frequency spectrum representation of the down-converted OFDM signal, in the 4K FFT mode, illustrating the baseband placement of the PLC subcarriers and the predefined continuous pilot subcarriers;

FIG. 20A shows one dominant harmonic at the center frequency, FIG. 20B shows two symmetrical dominant harmonics having a maximum off-set from the center frequency, and FIG. 20C shows one dominant harmonic whose frequency is at some offset "Delta f" from the center frequency;

DETAILED DESCRIPTION OF THE PREFERRED EMBODIMENT

The embodiment claimed herein is the CPS embodiment introduced and summarized above. The disclosure of the CPS embodiment is primarily found in FIGS. 1-2, 16, 18-19, 20A-20C, 21-24, & 25A-25B and in the description referring to these figures. FIGS. 1-17 and their accompanying description primarily concern a cross-correlation detection embodiment, which is claimed in co-pending application Ser. No. 14/855,643, filed Sep. 16, 2015, naming the same inventor. FIGS. 1-17 (especially FIGS. 1 & 16) are presented here to aid in the disclosure and understanding of the CPS embodiment and provide background to the claimed invention. In the CPS embodiment, the signature ("CPS signature") is different from the signature of the cross-correlation detection embodiment. One difference is the absence of reference samples in the CPS signature. In the CPS embodiment, reference samples are not cross-correlated with a detected leakage signal. Rather, the CPS signature contains information used for (1) tuning the leakage detector to receive a dominant harmonic(s) of a selected CPS, (2) validating that the harmonic(s) has been detected and is from an OFDM leakage signal, and (3) calculating the leakage level of an OFDM signal.

Figure 1:
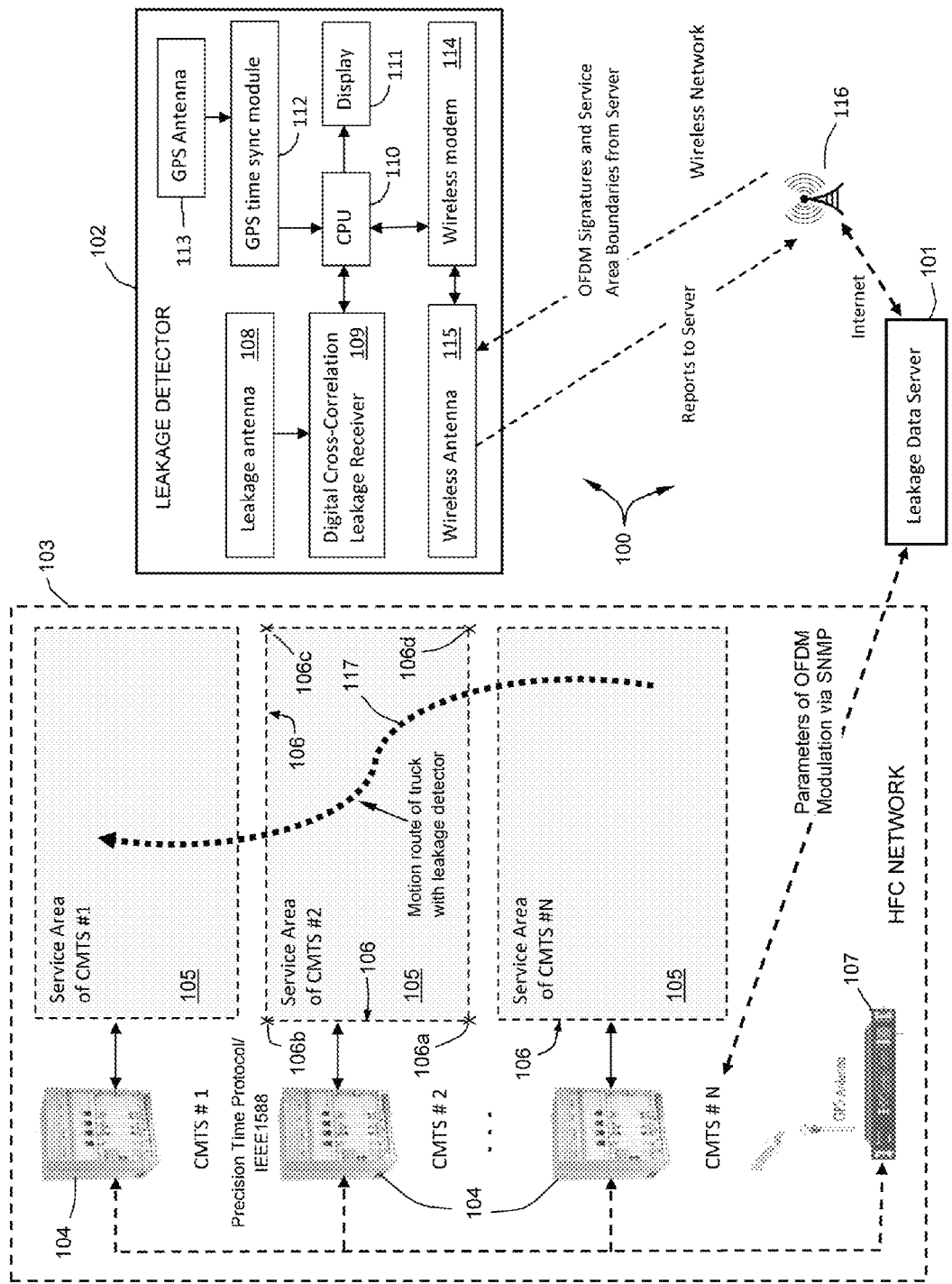
FIG. 1 is block diagram of a system of the present invention, along with its operational environment, for detecting leakage of an OFDM signal from a HFC network with a CCAP architecture.

An exemplary embodiment of a system 100 for detecting leakage of OFDM signals from an HFC network 103 is illustrated in the block diagram of FIG. 1. HFC network 103 is configured in accordance with a CCAP architecture. System 100 includes a leakage data server 101 and a field leakage detector unit 102. HFC network 103 includes N CMTS's 104, serving different service areas 105 of a coaxial cable portion of network 103. In general, a service area 105 may include a single hub or multiple hubs, a single node or a group of nodes, or other network subdivision or subsystem. Each service area 105 is defined by boundaries 106, which are defined by a set of corner points 106a-106d having geographic coordinates (e.g., longitude and latitude). Boundaries 106 and corner points 106a-106d are typically very accurate due to widely used electronic GIS maps in modern HFC networks. Also, HFC network 103 includes a Precision Time Protocol (PTP) grandmaster server 107, for accurate time synchronization of all CMTS's 104, according to the PTP/IEEE1588 specification. Grandmaster server 107 generates a GPS synchronized 10.24 MHz clock and 1 pulse per second (1PPS) signal. The time synced signals are used as a reference at all CMTS's 104 for time synchronization via the PTP/IEEE1588 specification. Therefore, all CMTS's form the same timestamps and 10.24 MHz master clock, which are used to form an OFDM signal according to the DOCSIS 3.1 specification. This means that OFDM signals, formed by different CMTS's 104 are synchronized from a common GPS clock. This is different from the case of forming QAM signals, where no strong time synchronization exists between different QAM modulators. The above-mentioned aspects of forming OFDM signals provide an opportunity for substantially eliminating the need for installing equipment at the headend for sampling the OFDM signals, to produce reference signal samples for use in a cross-correlation with leakage signal samples and detection of leakage in the field.

Figure 2:
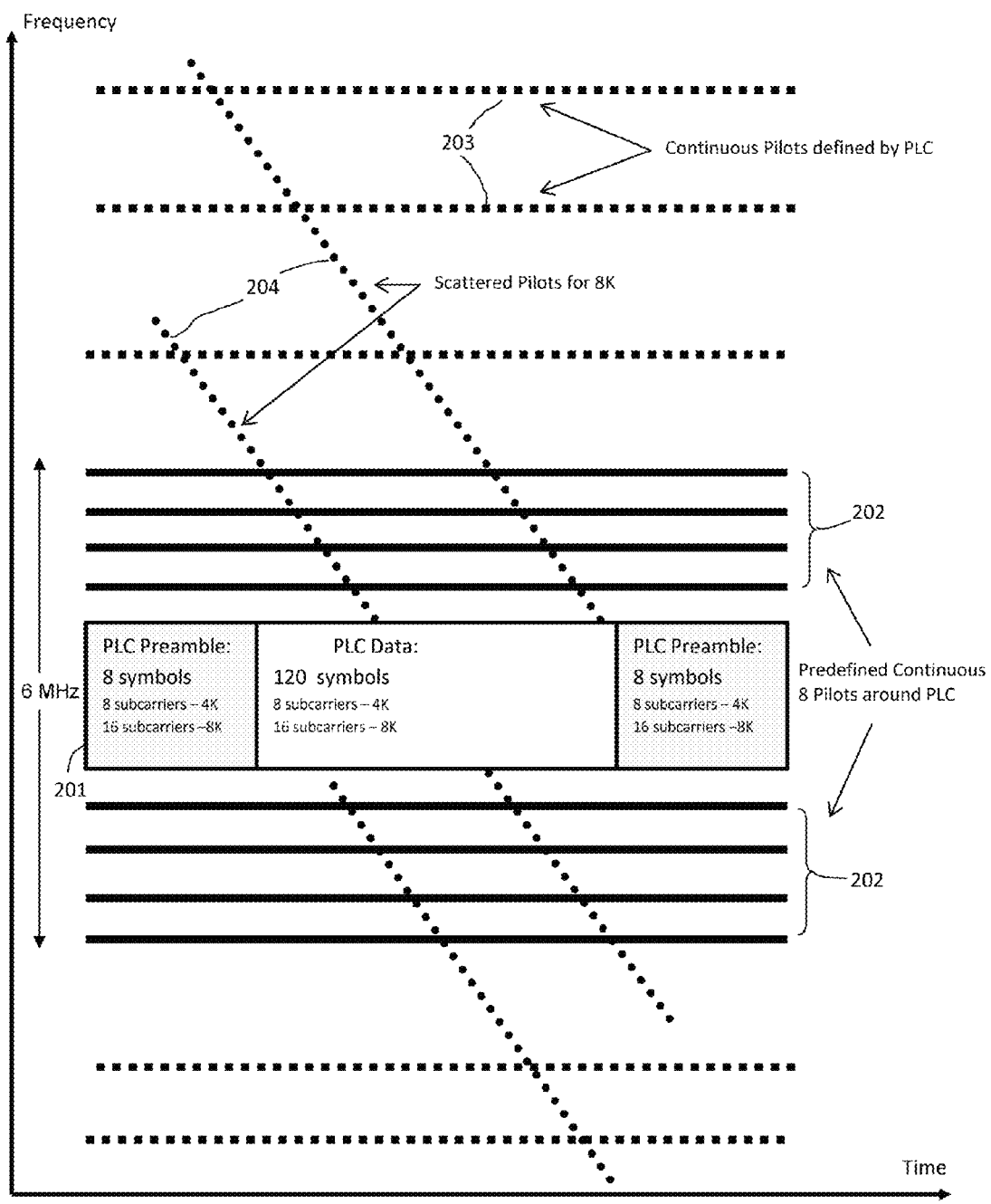
FIG. 2 is a frequency-versus-time diagram, illustrating the placement of PLC subcarriers and pilot subcarriers in a spectrum of an OFDM signal transmitted in a modern HFC network.

Again referring to FIG. 1, leakage detector 102 includes a leakage detector antenna 108, a digital leakage receiver 109, a computer or digital controller (CPU) 110, a display 111, a GPS time-sync module 112, a GPS antenna 113, a wireless modem 114, and a wireless antenna 115. In operation, leakage data server 101 initially retrieves from CMTS's 104, via Simple Network Management Protocol (SNTP), certain parameters of the OFDM signals formed at the different CMTS's 104. Server 101 also stores, in its database, boundaries 106 and/or boundary points 106a-106d of service areas 105, serviced by CMTS's 104. The information about boundaries 106 and/or points 106a-106d are uploaded to server 101 during an initial installation of system 100, and then preferably updated periodically by cable operator IT personal. After receiving the parameters of the OFDM signals from the different CMTS's 104, server 101 constructs so-called OFDM signal signatures for use in cross-correlation detection of OFDM leakage signals. The signatures are based (at least in part) on subcarriers which are part of the structure of an OFDM signal. FIG. 2 shows a typical pattern of different subcarriers used in an OFDM signal. More details about the OFDM signal structure and a method of constructing OFDM signal signatures are discussed below.

After powering up, leakage detector 102 connects to server 101 via an IP wireless network 116 and receives from server 101 ODFM signatures and updated information about boundaries 106 and/or boundary points 106a-106d. Initially, all boundary information is uploaded to CPU 110 of detector 102 during initial preparation of detector 102 for operation, and then only changes in the boundary information are updated in the CPU 110 via wireless network 116. This approach reduces wireless traffic and the handling of redundant information. Electronic files containing the boundary information and OFDM signatures are stored in memory associated with CPU 110.

A service vehicle or truck (not shown) containing leakage detector 102 starts patrolling the coaxial cable plant of HFC network 103. As shown in FIG. 1, the truck moves along a path 117, which extends through service areas 105. Areas 105 are serviced by different CMTS's 104, as shown in FIG. 1. Each second (or more often), CPU 110 of leakage detector 102 receives current GPS coordinates from GPS module 112 and determines the service area 105 in which the truck is currently located. Based on this information, CPU 110 sends to leakage receiver 109 a corresponding OFDM signature. Receiver 109 receives and down converts the over-the-air (or "off-air") OFDM leakage signal to a baseband signal and then cross-correlates it with the current OFDM signature, to detect the OFDM off-air leakage signal. When the truck approaches a boundary of a succeeding service area 105, in which the leak may be present, then CPU 110 sends to receiver 109 signatures of both the current and succeeding service areas 105. Receiver 109 then performs cross-correlation processing using both (or more) signatures, ensuring that the leakage signal is detected, whether originating from the current or succeeding service area 105. Also, the use of both signatures allows for the simultaneous detection of leakage originating from both adjacent service areas 105, especially when the truck is in a zone near a boundary 106 ("boundary zone"). Generally, the need to employ multiple signatures should not arise often, because service areas 105 are much larger than the smaller boundary zones (+/−30 . . . 100 meters) where measurable leakage may originate from an adjacent service area 105. From this discussion, it is understood that leakage detector 102 is adaptive, in that it selects an OFDM signature based on the service area 105 in which it is operating. Also, continuous wireless communication between detector 102 and server 101 is not necessary and is preferably not conducted. Information about leak level and time delay measurements and geographic coordinates of those measurements along route 117 is buffered in memory associated with CPU 110. CPU 110 will then periodically send short reports to server 101, via wireless modem 114, when the truck travels in an area with good signal strength of wireless network 116.

Figure 3A:
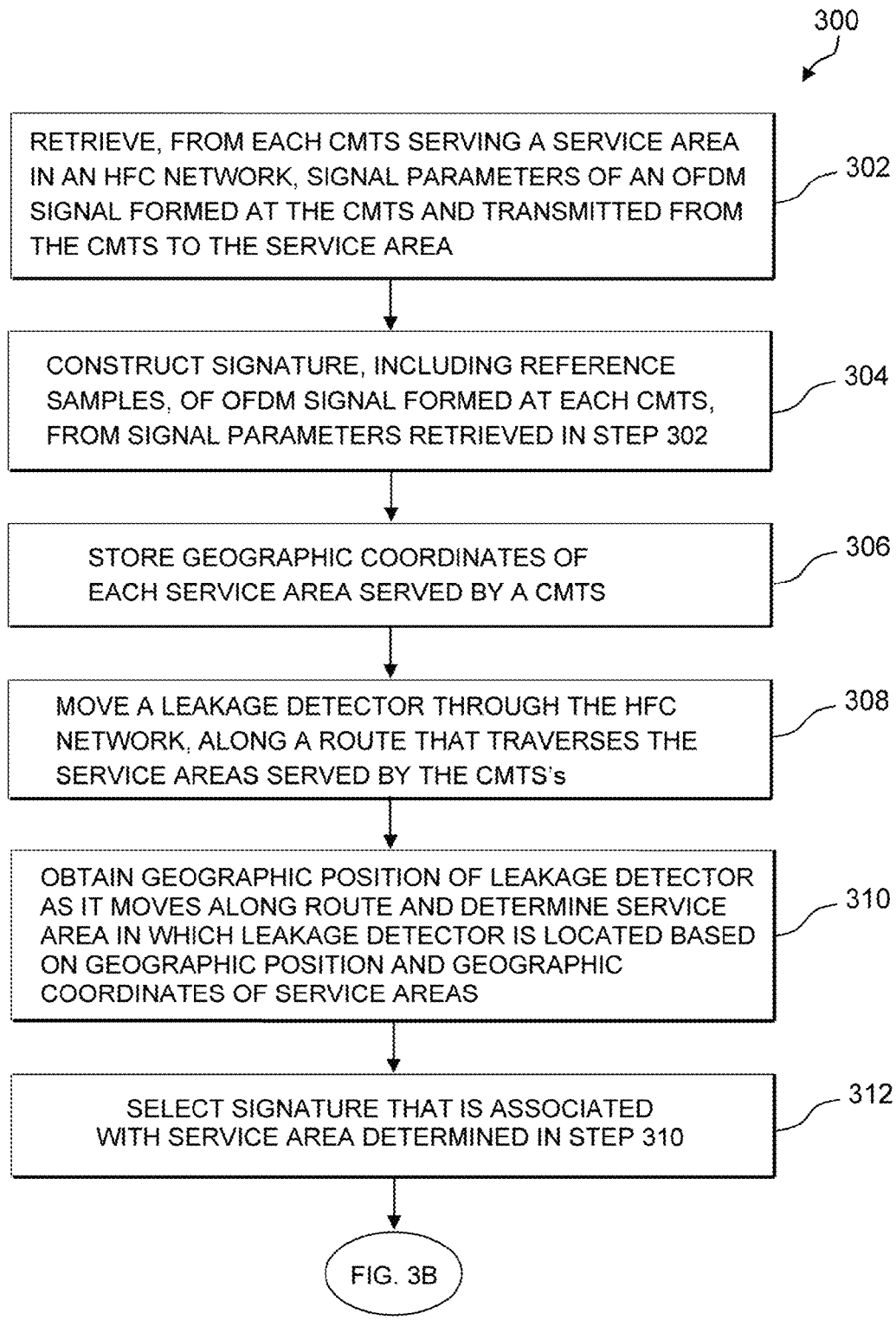
FIGS. 3A and 3B contain a flow diagram outlining a method of detecting and locating an OFDM signal leak from an HFC network.
Figure 3B:
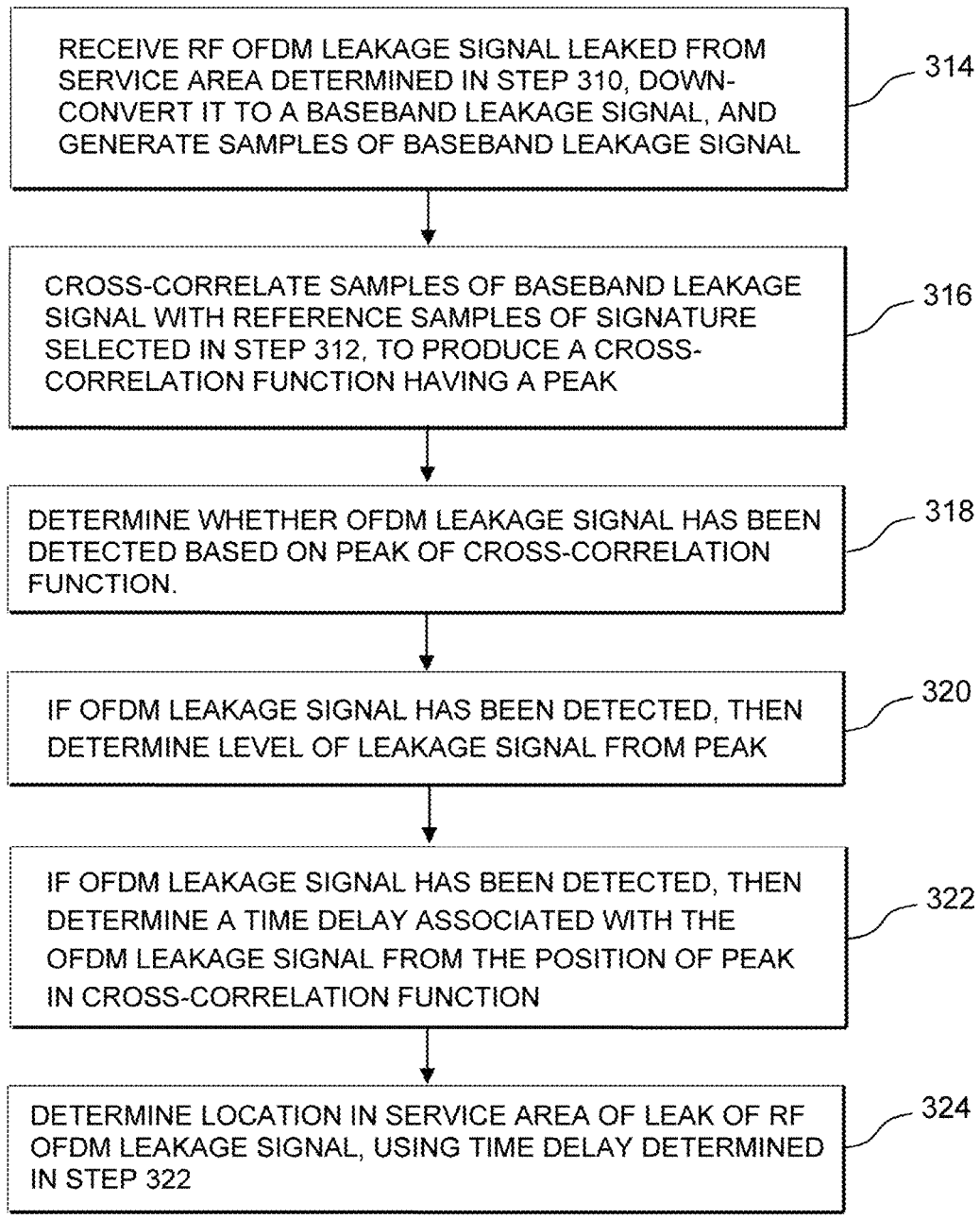
Figure 17:
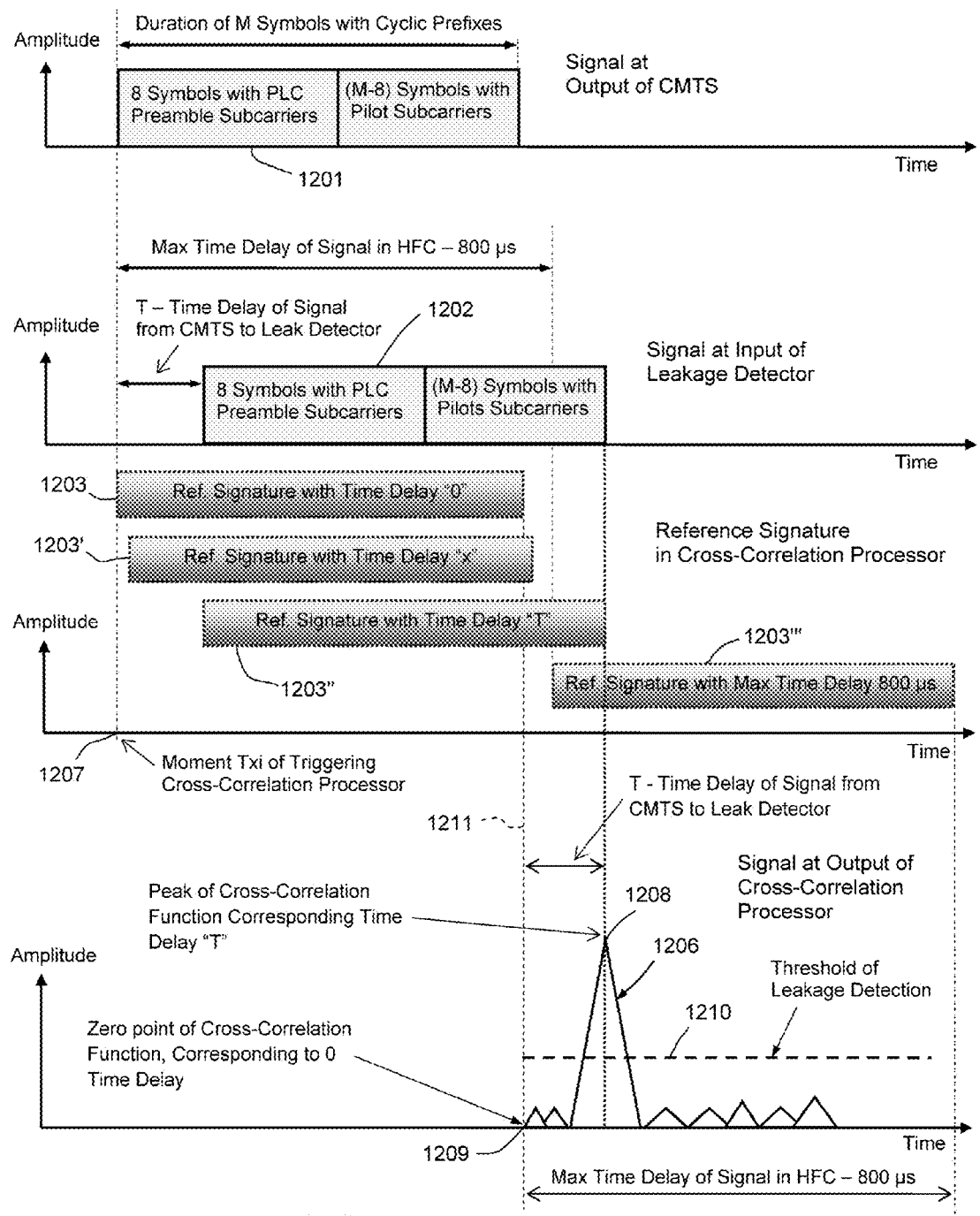
FIG. 17 is a series of amplitude versus time plots (time diagrams), illustrating the timing of: (a) an OFDM signal at the CMTS, (b) the signal (delayed) as received by the leakage detector, (c) an OFDM signature and delayed versions of the signature in a cross-correlation processor of the leakage detector, and (d) a cross-correlation function, at the output of the cross-correlation processor, containing a peak, which indicates a detection and level of the leakage signal and a time delay associated with the leakage signal.

A method of detecting and locating an OFDM signal leak, according to one embodiment of the present invention, will now be described with reference to the flow diagram in FIGS. 3A and 3B. A method 300 (FIG. 3A) comprises a number of steps in detecting and locating OFDM signal leakage. A step 302 involves retrieving, from each CMTS serving a service area in an HFC network, signal parameters of an OFDM signal formed at the CMTS and transmitted from the CMTS to the service area. A step 304 involves constructing a signature, including a set of reference samples, of the OFDM signal formed at each CMTS, from the signal parameters retrieved in step 302. A step 306 involves storing a set of geographic coordinates of each service area served by a CMTS. A step 308 involves moving a leakage detector through the HFC network, along a route that traverses the service areas served by the CMTS's (FIG. 1). A step 310 involves obtaining a geographic position of the leakage detector (GPS coordinates) as it moves along the route, and determining the service area in which the leakage detector is located based on the geographic position of the detector and the geographic coordinates of the service areas. A step 312 involves selecting a signature that is associated with the service area determined in step 310. Referring to FIG. 3B, a step 314 involves receiving an RF OFDM leakage signal leaked from the service area determined in step 310, down-converting it to a baseband leakage signal, and generating samples of the baseband leakage signal. A step 316 involves cross-correlating samples of the baseband leakage signal with reference samples of the signature selected in step 312, to produce a cross-correlation function having a peak (FIG. 17). A step 318 involves determining whether an OFDM leakage signal has been detected based on the peak of the cross-correlation function (e.g., based on whether the peak has exceeded a threshold, see FIG. 17). If a leakage signal has been detected, then, in a step 320, the level of the leakage signal is determined from the peak and, in a step 322, a time delay associated with the leakage signal (e.g., actual propagation time from CMTS to leakage detector) is determined from the position of the peak in the cross-correlation function. Lastly, in a step 324, a location (in the service area) where the RF OFDM leakage signal leaked is determined using the time delay determined in step 322.

One advantage of the present invention is that it will not be necessary to install equipment at the headend of network 103 for sampling the OFDM signal and to continuously transmit the resulting samples to a leakage detector in the field, via a wireless network. This advantage is achievable due, in part, to the common GPS synchronized clock used in forming the OFDM signals at the different CMTS's 104. But, how is it possible to perform cross-correlation detection of an ODFM leakage signal if the signal is like a noise signal? An answer to that question begins by referring to FIG. 2. A feature of an OFDM signal is that it is not as random as, for example, a QAM signal. An OFDM signal includes special predefined subcarriers for synchronization with cable modems (CMs) and for estimation of channel frequency response. These subcarriers have predefined BPSK modulation of OFDM symbol data, and the CMTS's that generate the OFDM signals have information (or parameters) about the modulation and about the frequency location and timing of the subcarriers in the OFDM symbols.

As shown in FIG. 2, an OFDM signal includes the following four groups of subcarriers formed by a CMTS:

1. Physical layer Link Channel (PLC) subcarriers 201, carrying a preamble of 8 symbols and a data payload of 120 symbols, thus having a period of 128 symbols. The number of PLC subcarriers in each symbol depends on the FFT mode, the number being 8 for a 4K FFT mode and 16 for an 8K FFT mode.

2. Eight predefined continuous pilot subcarriers 202 placed symmetrically (in the OFDM signal spectrum) at fixed locations around PLC subcarriers 201.

3. Other continuous pilot subcarriers 203, the placement of which (in the OFDM signal spectrum) is calculated independently at each CMTS and then defined in the PLC data. Thus, the number and location of these subcarriers varies and are unique for each CMTS.

4. Scattered pilot subcarriers 204, time synchronized with the PLC preamble.

Figures 4, 5:
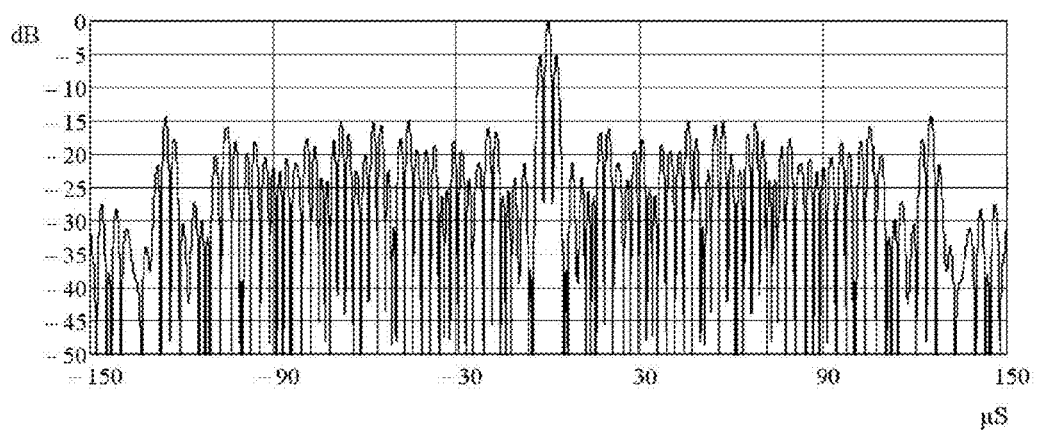
FIG. 4 is a table showing a BPSK constellation matrix for a PLC preamble signal of 8 symbols each containing 8 PLC subcarriers, for the 4K FFT mode, where the binary bits of the constellation matrix are used to BPSK modulate the PLC subcarriers.
FIG. 5 is a plot of an auto-correlation function of the PLC preamble signal of FIG. 4, over a time interval of +/−150 microseconds, which is comparable to a duration of 8 symbols in the 4K mode.
Figures 6, 7:
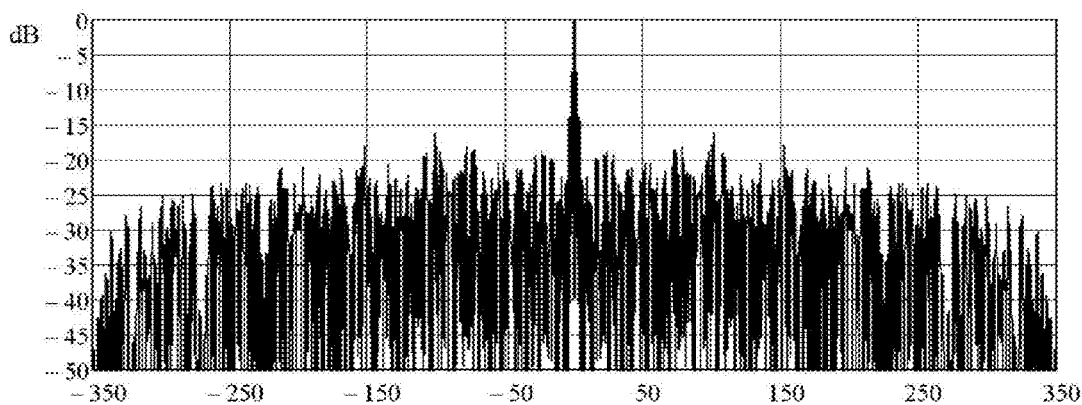
FIG. 6 is a table showing a BPSK constellation matrix for a PLC preamble signal of 8 symbols each containing 16 PLC subcarriers, for the 8K FFT mode, where the binary bits of the constellation matrix are used to BPSK modulate the PLC subcarriers.
FIG. 7 is a plot of an auto-correlation function of the PLC preamble signal of FIG. 6, over a time interval of +/−350 microseconds, which is comparable to a duration of 8 symbols in the 8K mode.

All of the above subcarriers have BPSK modulation within the OFDM symbols. For pilot subcarriers 202, 203 and 204 (groups 2-4), the BPSK modulation depends on the location of the subcarrier in the OFDM symbol and is defined by a pseudo-random sequence described in the DOCSIS 3.1 specifications. The BPSK modulation for the preamble portion of PLC subcarriers 201 is fixed and defined in the DOCSIS 3.1 specifications. FIGS. 4 and 6 show BPSK constellation matrixes for the preamble portion of PLC subcarriers 201, in the 4K and 8K FFT modes respectively. Thus, if the locations (placement) of the subcarriers in the OFDM symbols are known (e.g., initially pulled from CMTS's 104), then for any combination of subcarriers, it is possible to construct reference samples (as part of a signature) representing the original OFDM signal, for optimal cross-correlation detection. A method of constructing such reference samples and a complete OFDM signature will be discussed in more detail below.

Selection of OFDM Subcarriers for Cross-Correlation Detection

Now refer back to FIG. 2 for a discussion on which groups of predefined subcarriers should be used for cross-correlation detection of OFDM signal leakage. As known, the signal-to-noise ratio at the output of a cross-correlation detector (or a matched filter) depends on the energy of the useful signal and the spectral density of the noise (in the case of Gaussian white noise). So, from the point of view of effective detection of low level leakage signals, we wish to select a spectrum band where the energy of the predefined subcarriers is high or maximal. According to the DOCSIS 3.1 specifications, all pilot subcarriers in groups 2-4 (above) are boosted 6 dB relative to the level of other data subcarriers. Therefore, the use of subcarriers in one or more of groups 2-4 should be considered. However, the typical frequency off-set of continuous pilot subcarriers 203 (group 3) may be, e.g., about 4 MHz, according to the DOCSIS 3.1 specifications. Thus, this would require a very wide bandwidth for a leakage detector to receive a number of subcarriers 203. As a result, many strong off-air (over-the-air broadcast) interfering signals within the bandwidth of the detector may be received at the input of a low noise amplifier (LNA) of the detector and impact (overload) the leakage detector. FIG. 2 shows that the densest concentration of subcarriers is around PLC subcarriers 201. According to DOCSIS 3.1 specifications, PLC subcarriers 201 and pre-defined continuous pilot subcarriers 202 should be placed within a 6 MHz band (in the RF OFDM signal spectrum) "that is less susceptible to noise and interference." This means that off-air interfering signals should be minimal at the selected 6 MHz band. In light of the above considerations, it is preferred that PLC subcarriers 201 and adjacent continuous pilot subcarriers 202 be selected for detection of OFDM leakage.

Another factor in selecting subcarriers for cross-correlation detection is the form of the auto-correlation function of the subcarriers. Ideally, the form should approach the Dirac delta function to provide good resolution in the time domain, for measuring time delay of the signal. Time delay is used to locate the leak under a TDOA method or network database method. It is also desirable to have low side lobes in the auto-correlation function, to minimize false detection and mistakes in measuring time delay. FIGS. 5 and 7 show auto-correlation functions for 4K and 8K FFT modes, respectively, of the PLC preamble signal. The preamble signal comprises 8 symbols each containing the PLC subcarriers 201. In the 4K FFT mode of FIG. 5, there are 8 PLC subcarriers 201 (see FIG. 4), and in the 8K FFT mode of FIG. 7, there are 16 PLC subcarriers 201 (see FIG. 6). These functions are plotted over a time interval comparable to the duration of 8 symbols: +/−150 microseconds for the 4K FFT mode (each symbol containing 8 subcarriers) and +/−350 microseconds for the 8K FFT mode (each symbol containing 16 subcarriers). As shown in FIGS. 5 and 7, the auto-correlation functions of the PLC preamble signals have a dominant peak and multiple side lobes down from the peak by approximately 20 dB for the 8K FFT mode and a few dB higher for the 4K FFT mode. Thus, the PLC preamble signal is suitable for cross-correlation detection of OFDM leakage. The total energy of the preamble signal is not relatively high because it is made up of only 8 symbols. However, the extra energy of pilot subcarriers 202 are used to increase the total energy and achieve a more optimum cross-correlation detection result.

Figure 8:
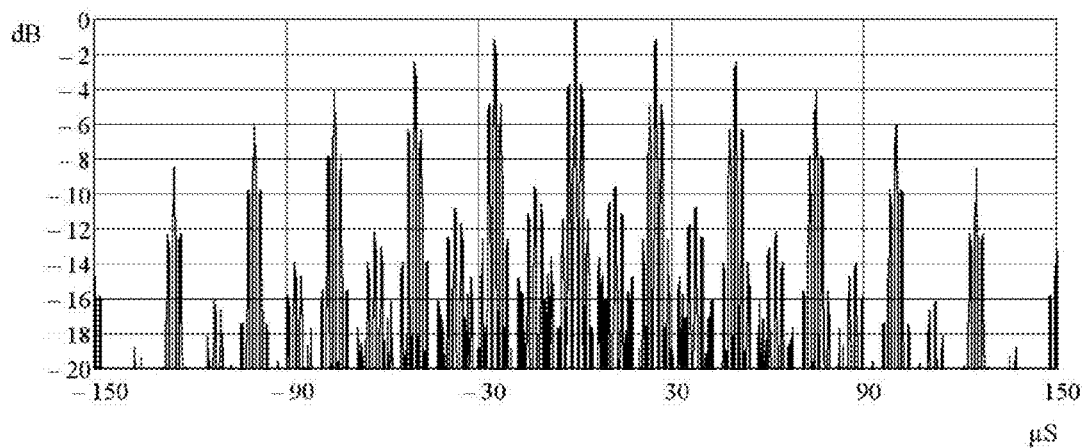
FIG. 8 is a plot of an auto-correlation function of a "pilot" signal of 8 symbols each containing the 8 predefined continuous pilot subcarriers (adjacent to the PLC subcarriers), the function being plotted over a time interval of +/−150 microseconds.
Figure 9:
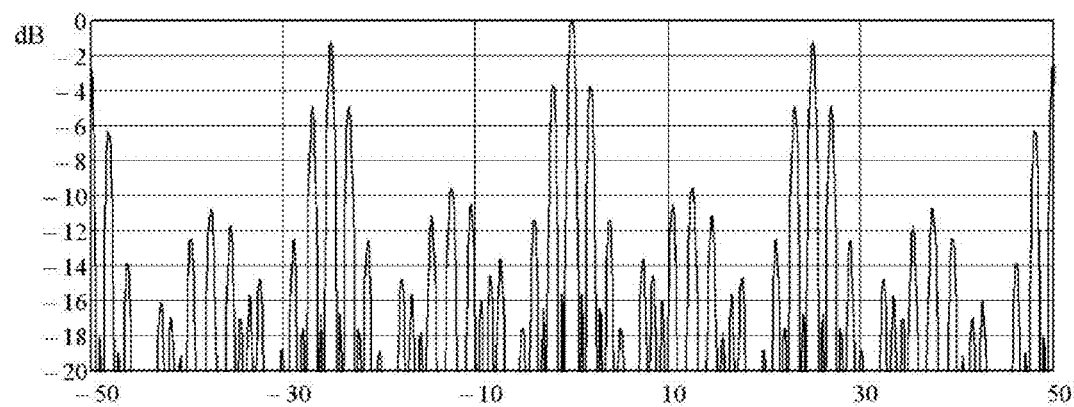
FIG. 9 is a plot of the auto-correlation function of FIG. 8, except over a time interval of +/−50 microseconds.
Figure 10:
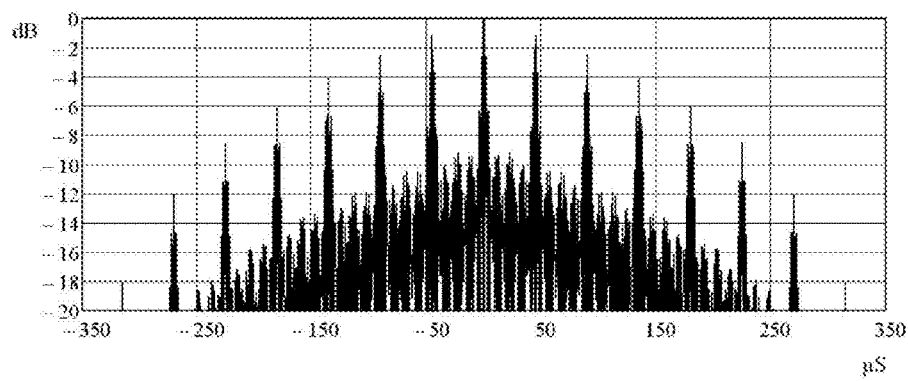
FIG. 10 is a plot of an auto-correlation function of a pilot signal of 8 symbols each containing the 8 predefined continuous pilot subcarriers, the function being plotted over a time interval of +/−350 microseconds.
Figure 11:
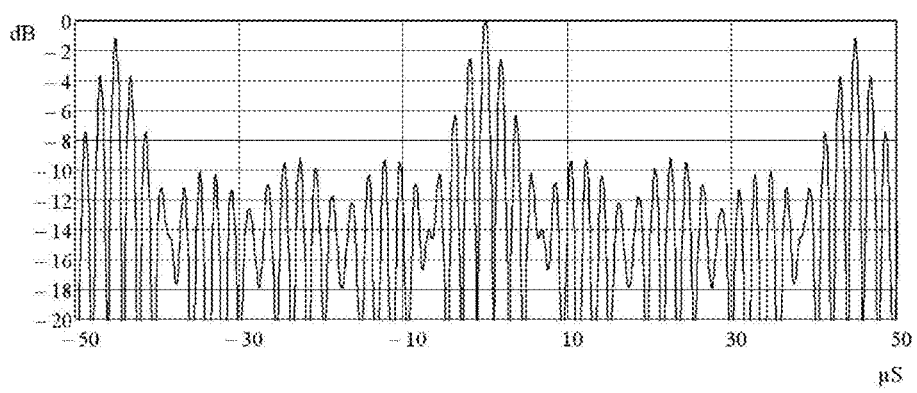
FIG. 11 is a plot of the auto-correlation function of FIG. 10, except over a time interval of +/−50 microseconds.

FIGS. 8 and 10 each show an auto-correlation function of a "pilot signal" that comprises 8 symbols, each containing the 8 predefined continuous pilot subcarriers 202. The auto-correlation functions in FIGS. 8 and 10 are plotted over time intervals+/−150 microseconds and +/−350 microseconds, respectively. These time intervals are the same as for the PLC preamble signals of FIGS. 5 and 7. FIGS. 9 and 11 are zoomed-in versions of FIGS. 8 and 10, respectively, showing the auto-correlation functions over a time interval of +/−50 microseconds. The auto-correlation functions in FIGS. 8 and 10 contain multiple peaks, which, under certain circumstances, could create ambiguities in measuring time delay. However, the absolute level of the highest peak of the auto-correlation function in FIG. 8 (4K mode) is about 6 dB higher than the peak in the PLC preamble auto-correlation function in FIG. 5 (4K mode). This is due to the CMTS's 104 boosting the level of the pilot subcarriers by 6 dB. For the 8K mode, the absolute levels of the auto-correlation functions in FIGS. 7 and 10 are the same, because the number of PLC subcarriers at the 8K mode is 16, or two times more than at the 4K mode. Thus, despite the multiple peaks in the auto-correlations of pilot subcarriers 202, if both groups of subcarriers (PLC and predefined pilot subcarriers) are used, this should produce an increase in energy of the signals for cross-correlation and a resulting increase in sensitivity of cross-correlation detection of OFDM leakage signals. Also, the energy of predefined pilot subcarriers 202 (actually of the pilot signal) may be increased by increasing the number of symbols (in the time domain)

included in the pilot signal. As shown in FIG. 2, the PLC preamble signal exists over only 8 symbols, but the pilot subcarriers exist over a continuous sequence of symbols. So, by increasing the number of symbols included in the pilot signal, e.g., from 8 to 16 or from 8 to 32, the sensitivity of cross-correlation detection may be increased by approximately 2-3 dB or 4-6 dB, respectively. Of course, there is a limitation on an increase in symbols, which is based on the period of the signal chosen for cross-correlation detection. For example, if the PLC signal is chosen, the number of symbols included in the pilot signal may be limited to 128 (see discussion of the PLC signal period Tplc below).

A further factor in choosing a subcarrier group for optimal OFDM leakage detection is whether there is a timestamp associated with the subcarrier group. A timestamp can be used for measuring a time delay of a subcarrier between a CMTS 104 and leakage detector 102. The time delay is used to locate the source of the leak under a TDOA algorithm or the network database method. Also, the timestamp can be used to trigger the cross-correlation process in leakage receiver 109. The use of timestamps is well-known in cross-correlation detection. There are two possible scenarios when considering timestamps: (1) the absolute (global GPS) time when formation of the signal at CMTS 104 begins is known; and (2) only the period of the signal formed at CMTS 104 is known. The first scenario exists in the leakage detection method described in U.S. Pat. No. 8,456,530, where signal sampling equipment (with a GPS receiver) is installed at the headed. Under this scenario, it is relatively straight forward to measure the absolute time delay of the leakage signal by cross-correlation detection. In the second scenario, absolute time delay is not measured, but, because the period of the signal formed at CMTS 104 is known and synchronized by a very stable GPS time sync, the cross-correlation receiver may be triggered with the period. Also, the cross-correlation peak (indicating detection of the leakage signal) will appear at a particular point on the time scale (time delay value) for a particular position of the leakage detector. As the leakage detector moves to a new position and detects the leakage signal at the new position, the point on the time scale is likely to move, representing a relative change in the time delay of the signal. This relative change makes it possible to measure time difference of arrival of the leakage signal based on different detector positions along the drive-out route. Thus, a TDOA algorithm is suited for the measurements obtained in the second scenario and can use them to calculate the location of the leakage source.

Figure 12:
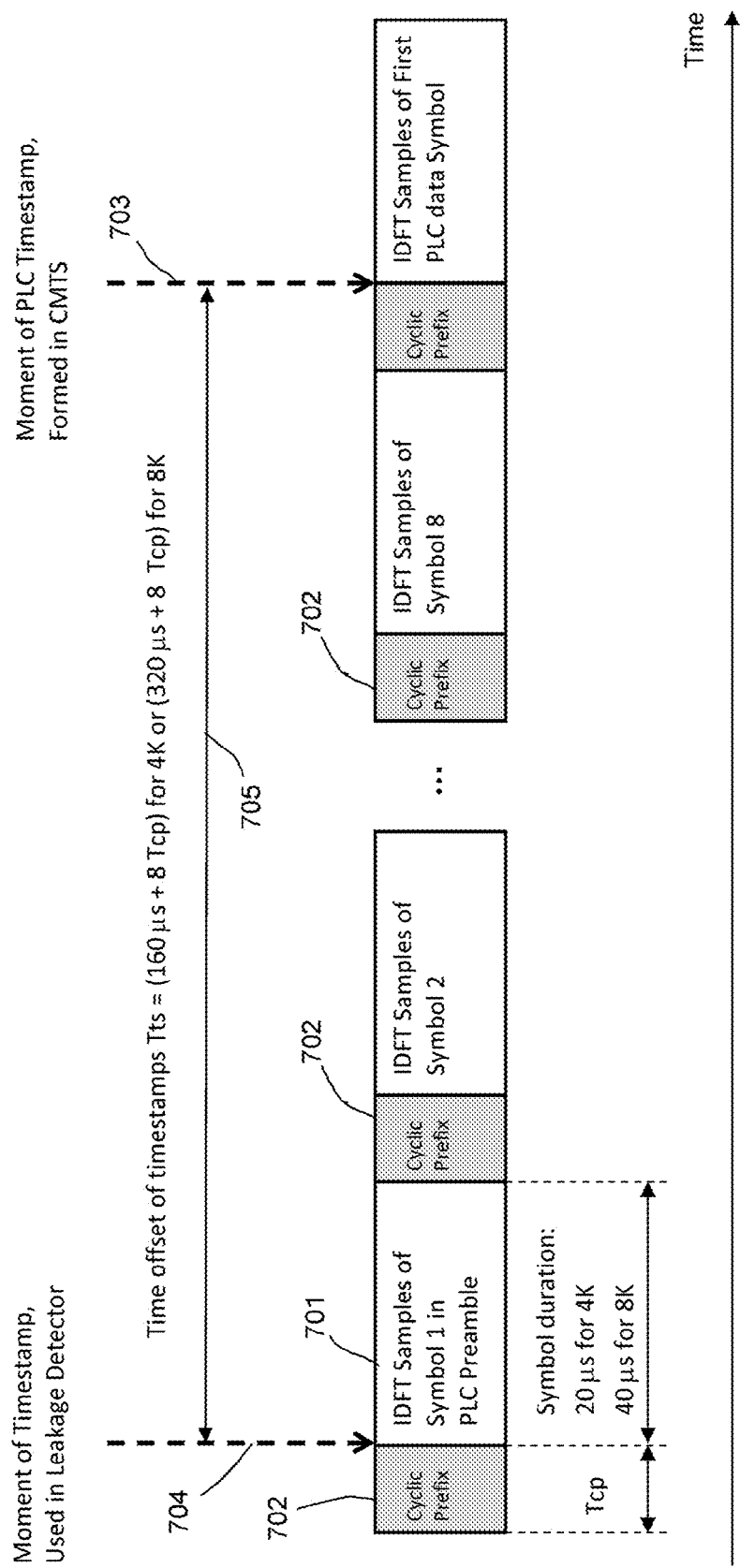
FIG. 12 is a time-frequency plane representation of PLC preamble symbols separated by cyclic prefixes, and indicating the moment of a PLC timestamp at the CMTS and the moment of a created timestamp used at a cross-correlation receiver.

Referring now to FIG. 12, there is shown a structure of the PLC preamble portion of an OFDM signal in the time domain. The PLC preamble includes eight symbols 701, each comprising pulses or inverse discrete Fourier transform (IDFT) samples. Symbols 701 each have a duration of 20 microseconds or 40 microseconds for 4K and 8K FFT modes, respectively. Symbols 701 are assembled together by the CMTS with cyclic prefixes or cyclic prefix (CP) pulses 702. The duration of cyclic prefixes 702 is defined in the DOSCIS 3.1 specification and may be different at different CMTS's 104 (FIG. 1). FIG. 12 shows (by a dotted-line arrow), a moment 703 of a timestamp formed by a CMTS. According to the DOCSIS 3.1 specification, "CMTS MUST define this timestamp with reference to the first OFDM symbol following the preamble." FIG. 12 also shows a moment 704 of the first sample after the IDFT of the first PLC preamble symbol in the frequency domain. Moment 704 is the moment when the PLC preamble of the OFDM signal (used for cross-correlation detection) starts to be formed with PLC subcarriers. Moment 704 is used for triggering the cross-correlation process in leakage detector 102. Moment 704 is strongly synchronized with the CMTS timestamp at moment 703 and is offset from it by Tts=(160 microseconds+8 Tcp) for the 4K FFT mode and Tts=(320 microseconds+8 Tcp) for the 8K FFT mode. So, if the CMTS timestamp (at moment 703) is known (e.g., initially retrieved from CMTS 104 by server 101), then moment 704 can be calculated at server 101.

If, for some reason, CMTS's 104 do not employ a timestamp (the DOSCIS 3.1 specification indicates that a timestamp is an optional requirement), then the period of the PLC signal, which is synchronized to a very stable GPS time sync, may be used for triggering the cross-correlation detector and measuring relative time delay (as indicated above). The period of the PLC signal equals 128 symbols (see FIG. 2) and its time duration is calculated as follows: Tplc=(2560 microseconds+128 Tcp) for the 4K FFT mode and Tplc=(5120 microseconds+128 Tcp) for the 8K FFT mode.

In view of the factors discussed above, both the PLC preamble and pilot signals (FIG. 2) are selected for cross-correlation detection of OFDM leakage signals. The minimum number of symbols should be at least 8 (number of symbols of preamble), but the number of symbols in the pilot signal may be increased to improve the sensitivity of the cross-correlation detection. It should be noted that the PLC preamble and pilot signals are placed within a 6 MHz bandwidth (FIG. 2), which is equal to the current U.S. QAM channel bandwidth and used in the current QAM Snare® cross-correlation leakage detectors (www.arcomdigital.com). Thus, to reconfigure the QAM Snare® system for detection of OFDM leakage, the QAM Snare® detector hardware will not have to be changed. The reconfiguration can be accomplished by updating the software in the leakage data server and the firmware in the detector. Reconfiguration is straight forward due to flexible re-programmable FPGA's and DSP's. Thus, the preferred embodiment of the present invention can be implemented in a cost-effective manner.

Construction of OFDM Signature

In order to achieve the objective of cross-correlation detection without the use of signal sampling equipment at the headend or at each CMTS, an OFDM signature is constructed or calculated in leakage data server 101 (FIG. 1). An exemplary method 800 of constructing such a signature is presented in the flow diagram of FIGS. 13A and 13B. In a first step 801, data server 101 retrieves from all CMTS's 104 (via SNMP) the following OFDM signal parameters: (1) the FFT mode, 4K or 8K; (2) cyclic prefix duration (in microseconds) and number of cyclic prefix samples Ncp; (3) lowest subcarrier number in PLC preamble and its frequency in the RF band (MHz); (4) PLC (or CMTS) preamble timestamp; and (5) value "X," used for boosting pilot subcarriers.

In a second step 802, data server 101 calculates a local oscillator (LO) frequency, which is used to down convert the received leakage signal to zero IF (baseband) in leakage receiver 109. For this calculation, information is used about the location of the PLC subcarriers at RF (e.g., the lowest RF (MHz) subcarrier frequency in the PLC preamble). In the preferred embodiment, the following rules are used for calculation of the LO frequency:

1. The LO frequency must equal an RF frequency of a subcarrier. This requirement provides (as will be shown) for a correct or orderly formation of reference samples during an IDFT operation of the OFDM symbols (see FIGS. 14A, 14B & 15).

2. The LO frequency should be selected to be within the bandwidth (e.g., 400 kHz) of the PLC preamble subcarriers, plus or minus some frequency offset (in KHz). The offset is defined based on the maximum frequency of the baseband leakage signal at leakage receiver 109. For example, if the maximum baseband frequency is 3000 kHz, then the offset is determined by the formula:

Offset (kHz)=3000 kHz−400 kHz−2350 kHz=250 kHz, where 400 kHz is the bandwidth of the PLC subcarriers and 2350 kHz is the maximum fixed offset of predefined continuous pilot subcarriers 202 from the edge of the PLC subcarriers band (DOCSIS 3.1 Specification). Thus, for an offset of +/−250 kHz, the LO frequency may be placed anywhere within a band from RF min=(lower PLC subcarrier RF frequency−250 kHz) to RF max=(upper PLC subcarrier RF frequency+250 kHz). Under these conditions, all PLC subcarriers 201 and predefined pilot subcarriers 202 will be down-converted into a working baseband of 3 MHz (FIG. 14B).

3. The LO frequency should also be selected to minimize interference with internal harmonics that may be generated in leakage detector 102, e.g., by a master clock. For example, if leakage detector 102 is clocked at 10 MHz by a master clock, then high order harmonics with 10 MHz steps may overlap with the (RF max−RF min) band selected under Rule 2 above. In this case, to prevent such interference at baseband, an LO frequency is selected to be equal to an interfering harmonic. Due to the fact that the LO frequency would also be synchronized by the 10 MHz master clock, this would result in the suppression of the harmonic at baseband, because the LO frequency is converted to zero (DC) frequency.

FIGS. 14A and 14B illustrate an example of selecting an LO frequency for the 4K FFT mode and a 3 MHz baseband in leakage receiver 109. As shown in FIG. 14A, LO frequency 901 is selected to be 100 kHz higher than the upper edge of the PLC subcarrier band and equal to the second data subcarrier slot above the PLC subcarrier band edge. At this LO frequency, all PLC subcarriers 201 and the predefined pilot subcarriers 202 from both sides of the PLC subcarrier band (−4, −3, −2, −1, +1, +2, +3, +4 in FIG. 14A) will be down-converted to a 3 MHz baseband, as shown in FIG. 14B.

Now referring back to FIG. 13A, in a step 803, a timestamp Tx (704 in FIG. 12) is calculated for use in leakage receiver 109 and the period of the PLC signal is calculated. The timestamp is calculated by subtracting offset Tts (FIG. 12) from the CMTS timestamp (703 in FIG. 12) retrieved from CMTS 104:

Tx=Tcmts−Tts, where Tts=(160 microsec.+8 Tcp) for 4K FFT mode and Tts=(320 microsec.+8 Tcp) for 8K FFT mode. The PLC signal period is calculated by the early discussed formulas:

Tplc=(2560 microsec.+128 Tcp) for 4K FFT mode, and

Tplc=(5120 microsec+128 Tcp) for 8K FFT mode.

Figure 16:
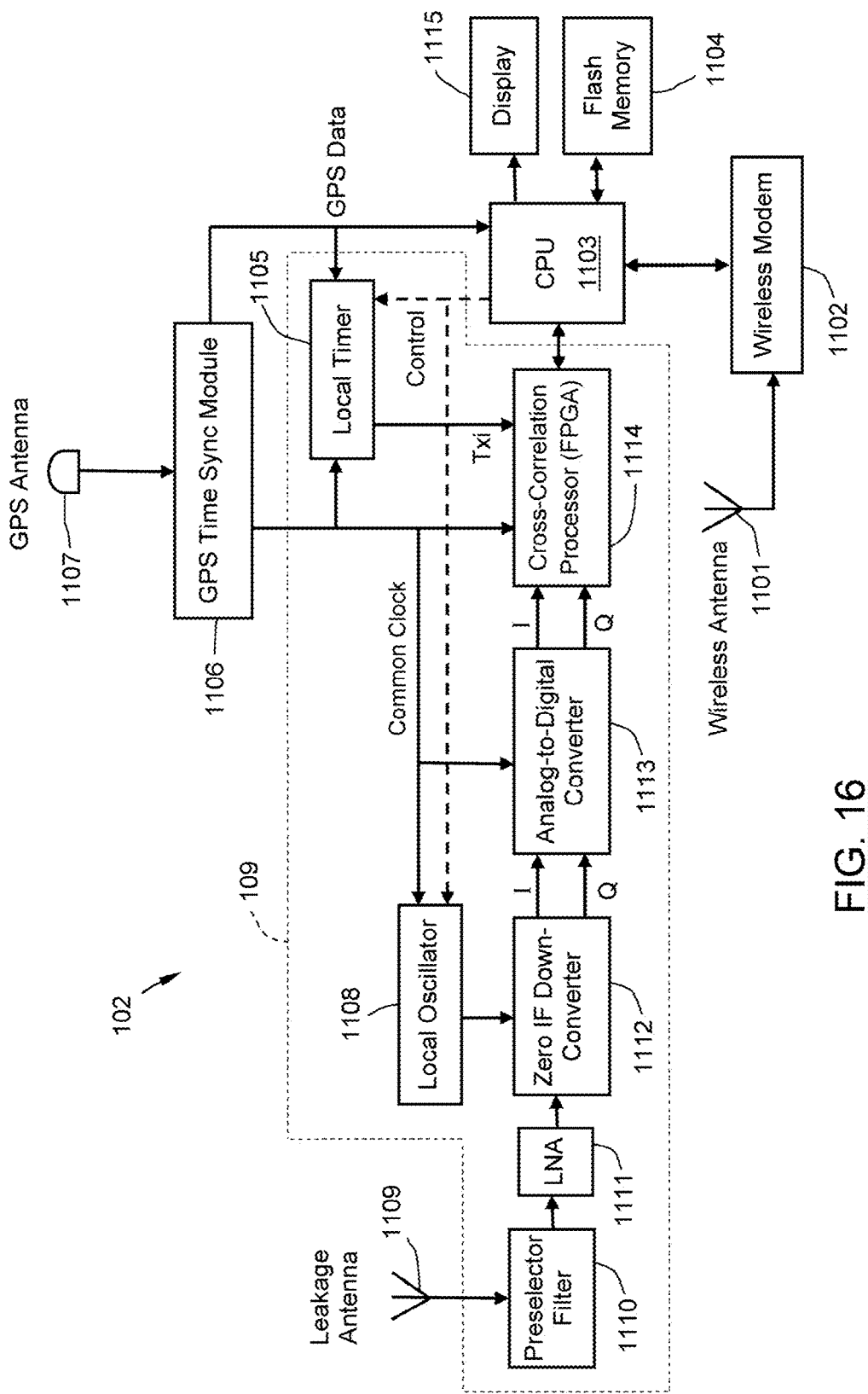
FIG. 16 is a block diagram of one embodiment of a leakage detector of the present invention.

The calculated timestamp Tx is then re-generated in detector 102 to create succeeding local timestamps or triggering pulses Txi. These local timestamps/triggering pulses are created by using the period Tplc and a local GPS clock as a reference clock. In other words, Tx is used to setup the initial phase of the local timer in leakage detector 102 and Tplc is used to setup the period of pulses Txi from the local timer (FIG. 16, 1105). The accuracy of the local GPS clock maintains synchronism of the locally generated timestamps with the CMTS timestamp to within a few microseconds during a day (24 hours). So, in general, it is enough to receive the CMTS timestamp once a day, e.g., upon initial connection to server 101. However, CMTS timestamps may be retrieved from CMTS 104 more frequently than once a day to calculate and update local timestamps Tx more frequently.

In a next step 804 (FIG. 13A), a calculation of BPSK modulation is performed for pilot subcarriers 202. According to the DOCSIS 3.1 specifications, the pilot subcarriers are BPSK modulated using a pseudo-random sequence, which is generated using a 13-bit linear feedback shift register with polynomial $(x^{13}+x^{12}+x^{11}+x^{8}+1)$. The shift register is clocked after every subcarrier (pilot, data, etc.) of the discrete Fourier transform (DFT) defining the OFDM signal. Each subcarrier is designated by an index number, k, which also indicates the actual location of the subcarrier in the RF band of the OFDM signal. The index numbers are: k=0 to 4095 for a 4K FFT signal; and k=0 to 8191 for an 8K FFT signal. If a subcarrier is identified (e.g., by its location or index number k) as a pilot, the output of the shift register is used to define the BPSK modulation for that pilot subcarrier. Further details of the BPSK modulation are found in the DOCSIS 3.1 Physical Layer Specification at section 7.5.15.3 (Jun. 10, 2014).

In addition to actual subcarrier locations indicated by index numbers k, the locations of pilot subcarriers 202 (e.g., designated −4, −3, −2, −1, +1, +2, +3, +4 in FIG. 14A) are also defined relative to the edges (lower and upper) of the PLC subcarrier band by the following table, where "n" is the number of subcarriers from the lower or upper edge:

| FFT Mode | Pilots +/− 1 | Pilots +/− 2 | Pilots +/− 3 | Pilots +/− 4 |
|---|---|---|---|---|
| 4K (PLC 8 subcarriers) | n = 15 | n = 24 | n = 35 | n = 47 |
| 8K (PLC 16 subcarriers) | n = 30 | n = 48 | n = 70 | n = 94 |

The subcarrier frequency spacing is 50 kHz for a 4K FFT signal and 25 kHz for an 8K FFT signal. Thus, the nominal frequency off-sets of pilot subcarriers 202 are the same for 4K and 8K FFT modes and can be easily calculated. They are: 750 kHz for pilots+/−1; 1200 kHz for pilots+/−2; 1750 kHz for pilots+/−3, and 2350 kHz for pilots+/−4. Because data server 101 (FIG. 1) has retrieved the locations of PLC subcarriers 201 (e.g., indicated by index numbers, k), the locations (e.g., indicated by index numbers, k) of pilot subcarriers 202 can be calculated using the above table, and for those locations, server 101 can calculate or determine the BPSK modulation for each pilot 202 (e.g., determine the BPSK modulation phase: 0 or 1 and BPSK constellation point equal to 1+j0 or −1+j0, respectively).

Figure 15:
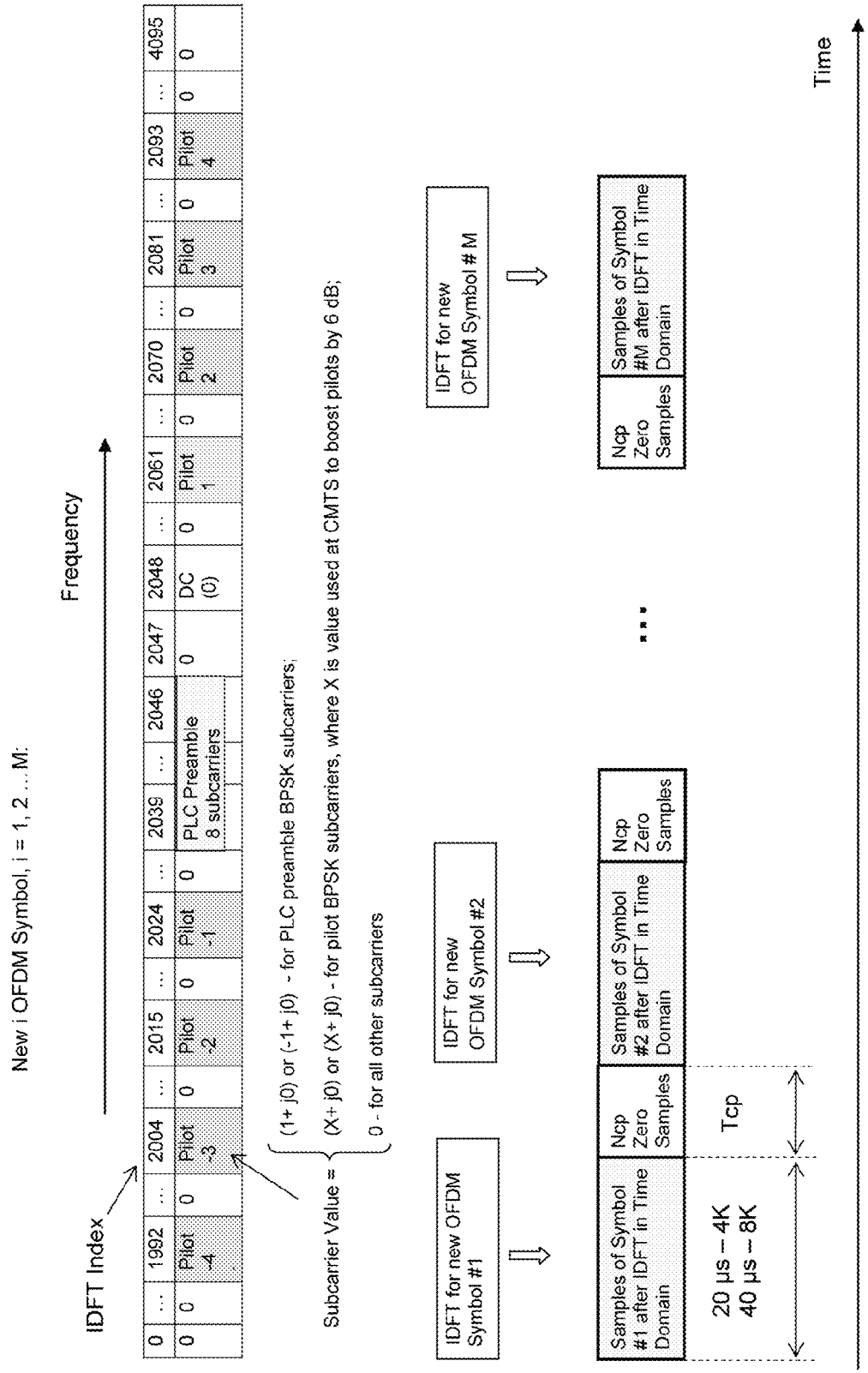
FIG. 15 illustrates some of the steps in forming one type of OFDM signature, where the steps are: (a) forming M number of new OFDM symbols, (b) assigning values to different subcarriers of the OFDM spectrum, (c) performing a 4K IDFT of the new symbols to produce reference samples of the resulting time domain signal, and (d) producing zero stuffing samples in place of cyclic prefix samples.

In a next step 805 (FIG. 13A), M number of new OFDM symbols are created, where the first eight new symbols are placed at the PLC subcarrier locations, to produce a PLC preamble signal, and the remaining new symbols are place at the predefined continuous pilot subcarrier locations to produce a pilot signal with BPSK modulation phases determined in step 804. FIG. 15 shows an example of creating M number of new symbols for the 4K FFT mode. The new symbols and constructed preamble and pilot signals are used to create baseband OFDM reference signal samples for cross-correlation (in receiver 109) with actual samples of the detected OFDM leakage signal. This is why the subcarriers selected for detection of OFDM signal leakage (i.e., PLC subcarriers and adjacent continuous pilot subcarriers) are, in a step 806, placed (shifted) into the baseband (area of DC OFDM sample) at the same locations as the corresponding PLC and pilot subcarriers of the actual baseband leakage signal (FIG. 14B). The BPSK modulations of the pilot subcarriers, as determined in step 804, are saved. FIG. 14B illustrates what the baseband signal constructed with the M number of new symbols might look like. The PLC subcarriers (carrying the new symbols) are placed at locations k=2039 to 2046 and are thus off-set by two subcarriers (e.g., 50 kHz×2=100 kHz) from the DC subcarrier slot of k=2048 (FIG. 15). The relative locations of pilot subcarriers (−4, −3, . . . 3, 4) are saved and are the same as with the actual pilot subcarriers.

In a step 807, the amplitude of the pilot subcarriers is increased (relative to the amplitude of the PLC subcarriers) by a value "X" (e.g., 2), which is a value used at the CMTS for boosting the amplitude of the pilots. In step 801, this value "X" was retrieved from CMTS's 104 by data server 101. In the constructed OFDM signature, the other subcarriers (i.e., other than PLC subcarriers and predefined continuous pilot subcarriers) are not used in the detection of the OFDM leakage signal. Thus, in step 807, these other subcarriers are excluded from the M number of new symbols (and from the OFMD signature spectrum) by nulling or zero-valuing these subcarriers prior to the IDFT calculation.

Figure 13A:
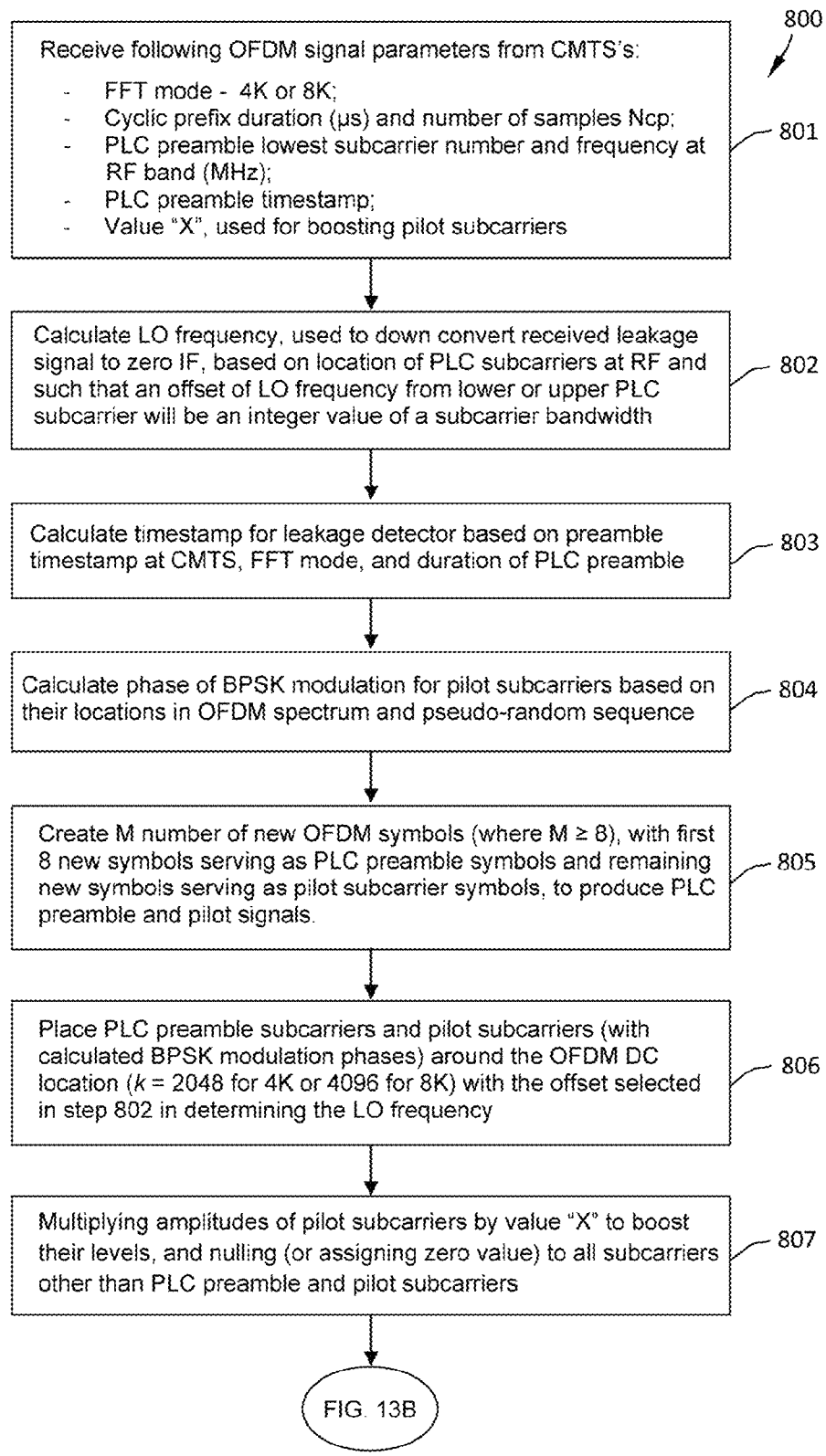
FIGS. 13A and 13B show a flow diagram illustrating a method of the present invention of creating an OFDM signature for use in detecting leakage of an OFDM signal.
Figure 13B:
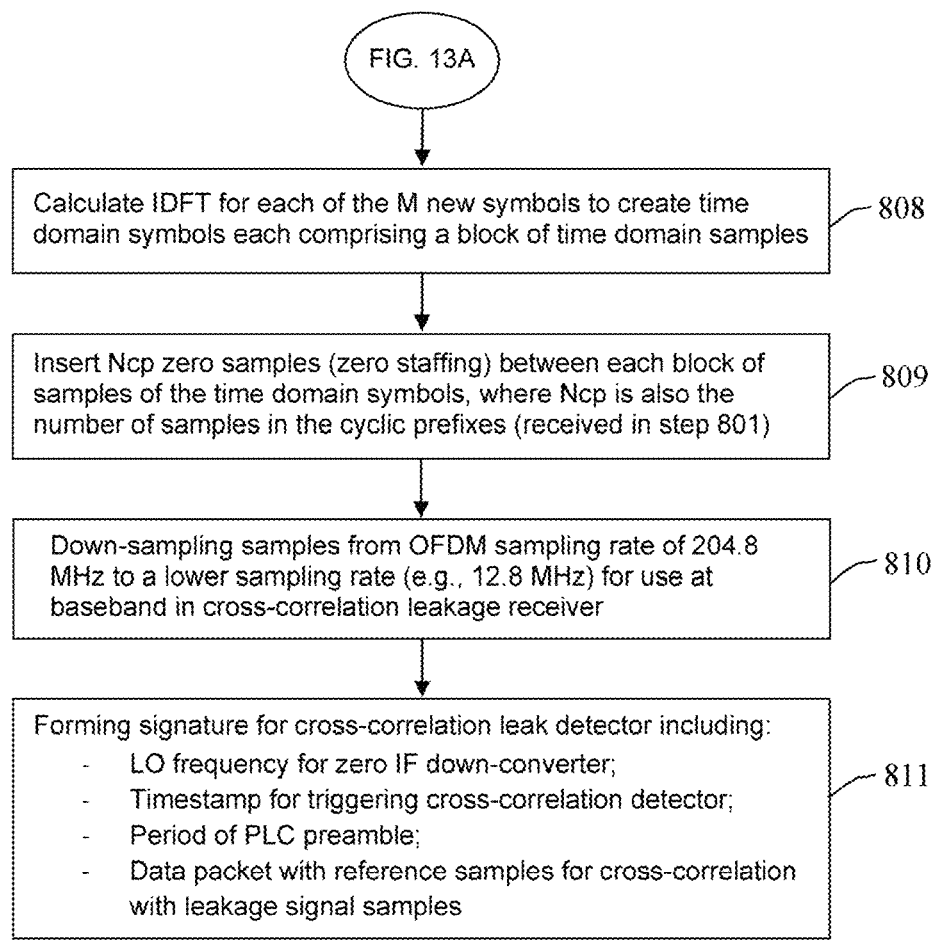

Referring now to FIG. 13B, method 800 of constructing an OFDM signature continues. In a step 808, an IDFT is calculated for each of the M number of new symbols. The results of these calculations are 4K or 8K complex samples for each OFDM symbol in the time domain. The duration of each time domain symbol is 20 microseconds for 4K IDFT (i.e., 4096 samples×1/204.8 MHz) and 40 microseconds for 8K IDFT (8192 samples×1/204.8 MHz), because the IDFT is calculated at a clock rate of 204.8 MHz, according to DOCSIS 3.1 Physical Layer Specification, Section 7.5.7.1 (Jun. 10, 2014).

In a step 809 (FIG. 13B), Ncp number of zero samples are inserted between the blocks of samples of the M number of time domain symbols ("zero stuffing"), instead of using cyclic prefix samples. The number of zero samples is equal to the number of cyclic prefix samples, Ncp, which number was retrieved from CMTS's 104 in step 801. The sequence of the assembled samples after the IDFT and zero stuffing steps is shown in FIG. 15. It should be noted that the use of zero stuffing instead of cyclic prefixes is done to make the calculation simpler. The energy of the signal at the cyclic prefixes is not essential for leakage detection compared with the energy of the PLC and pilot subcarrier signals.

In a next step 810 (FIG. 13B), the complex samples calculated in step 808 and 809 are transformed into real parts and down-sampled from the 204.8 MHz clock rate (used at IDFT in step 808) to a lower clock rate for cross-correlation in leakage detector 102. The simplest way to down-sample is to divide the 204.8 MHz clock rate by $2^Y$, where Y is an integer. For example, in the case illustrated in FIG. 14B, where the baseband is 3 MHz, it makes sense to select the clock rate for cross-correlation to be 204.8 MHz/$2^4$=204.8/16=12.8 MHz. This makes sense because down-sampling is a simple decimation by 16. If, for example, 10 MHz clock is used in the cross-correlation detector, then the procedure of down-sampling will require more calculations (which is not a problem for a powerful CPU used at the server). For example, down-sampling from 204.8 MHz to 10 MHz (for a 3 MHz baseband) can be done by a decimation by 36 to a clock rate of 6.4 MHz, then up-sampling to 160 MHz (6.4×25=160 MHz), and finally a decimation by 16 to 10 MHz. The number of bits for each sample after down-sampling (decimation) must be selected. Simple emulations show that at least 4 bits are enough for effective leakage detection in the cross-correlation receiver.

In a final step 811 (FIG. 13B), an OFDM signature is assembled in a data packet for transmission to leakage detector 102. This data packet includes: (1) LO frequency for zero IF down-conversion of leakage signal; (2) a timestamp Tx for triggering the cross-correlation process; (3) period of PLC signal; and (4) a data packet with reference samples for cross-correlation with leakage signal samples. Most of the data of the data packet will be reference samples. Consider an example for detection of an 8K OFDM signal with a maximum PLC preamble duration (FIG. 2), where the number of symbols is M=8. Also, assume a 3 MHz baseband at the output of the down-converter (FIG. 16, 1112), a 12.8 MHz clock for the cross-correlation processor (FIG. 16, 1114), and the cyclic prefix has a maximum number of samples at a 204.8 MHz master clock rate, Ncp=1024 (Tcp=5 microseconds). The total number of time domain samples, after decimation by 16 to a 12.8 MHz clock rate, will be:

$$L=[(8\times 8182)+(7\times 1024)]/16=4544.$$

This is less then 2.3 kB for 4 bit samples. Obviously, the full data packet with LO frequency, timestamp, preamble period, and reference samples will be within only 3 kB. Generally, there is no problem in transmitting such a data packet via a modern 3G/4G wireless network. For example, the same data packet size is currently transmitted twice per second in the QAM Snare® system (www.arcomdigital.com), from a remote server to a number of field leakage detectors and the system works well.

Referring now to FIG. 16, a detailed block diagram of field leakage detector 102 (FIG. 1) is shown. Digital leakage receiver 109 of detector 102 includes a preselector filter 1110, a low noise amplifier (LNA) 1111, a zero IF quadrature down-converter 1112, a dual channel analog-to-digital (A/D) converter 1113, an in-phase and quadrature cross-correlation processor 1114, a local timer unit 1105, and a local oscillator 1108. At the input of preselector filter 1110 is a leakage antenna 1109. Detector 102 also includes a computer or digital controller (CPU) 1103 with an associated flash memory 1104 and a display 1115. Detector 102 further includes a GPS time sync module 1106, a GPS antenna 1107 connected to module 1106, a wireless modem 1102, and a wireless antenna 1101 connected to modem 1102. After CPU 1103 is switched ON, it connects to, via wireless modem 1102 and antenna 1101, leakage data server 101 (FIG. 1). Server 101 responds by sending to detector 102 data packets of signatures of the OFDM signal. The signatures are received at modem 1102, transferred to CPU 1103, and then stored in flash memory 1104. Also received from server 101 and stored in flash memory 1104 is boundary or location information about the different areas 105 serviced by different CMTS's 104. The boundary or location information is uploaded into flash memory 1104 during an initial period when detector 102 prepares for operation within HFC network 103. The boundary or location information may be periodically updated via wireless modem 1102 from server 101. Thus, when detector 102 is switched OFF and then later, on another work day, it is switched back ON, the signatures will already be present in flash memory 1104, making it unnecessary to call for the signatures again from server 101.

With further reference to FIG. 16, CPU 1103 receives GPS coordinates of detector 102's current position from GPS time sync module 1106, compares those coordinates with predefined boundary coordinates of service areas 105, and then selects a signature based on the service area in which detector 102 is currently located. Then, CPU 1103 transfers timestamp Tx and the PLC signal period Tplc from the selected signature to local timer 1105. Local timer 1105 uses the clock from GPS module 1106. Local timer 1105 also receives National Marine Electronics Association (NMEA) data from module 1106. Thus, local timer 1105 is strongly synchronized with GPS global time. After receiving timestamp Tx and the PLC signal period Tplc, local timer 1105 re-generates Tx every period Tplc to produce a triggering pulse Txi (every period Tplc), for cross-correlation processor 1114. Triggering pulses Txi are formed each moment when Txi=(Tx+i×Tplc), where "i" is an integer.

With further reference to FIG. 16, CPU 1103 controls the LO frequency of local oscillator 1108. CPU 1103 programs or sets the LO frequency of local oscillator 1108 to the LO frequency received from the currently selected signature. The off-air OFDM leakage signal is received by antenna 1109, then passes through preselector filter 1110, is amplified by LNA 1111, and then enters down-converter 1112. Local oscillator 1108 is connected to down-converter 1112 and provides down-converter 1112 with the LO signal for down-conversion of the RF OFDM leakage signal to the baseband OFDM leakage signal. Filtered in-phase (I) and quadrature (Q) components of the baseband OFDM leakage signal are digitized in A/D converter 1113. The digitized I and Q component signals are then received by I and Q branches, respectively, of cross-correlation processor 1114. Processor 1114 is implemented in a field programmable gate array (FPGA). Processor 1114, local oscillator 1108, and local timer 1105 all use the same common GPS clock signal from GPS module 1106. Processor 1114 is triggered by pulses Txi from local timer 1105. Processor 1114 calculates a cross-correlation function representing the cross-correlation of the baseband leakage signal (both I and Q components) with the reference samples from the current OFDM signature (selected by CPU 1103 based on the current position of detector 102). An example of a cross-correlation calculation is disclosed in U.S. Pat. No. 8,456,530 (FIG. 8 and accompanying description). If a peak of the cross-correlation function exceeds some threshold level (see FIGS. 17, 1208 & 1210), then CPU 1103 makes a decision that a leak has been detected. The results of leakage detection, including but not limited to the cross-correlation function, are displayed on display 1115. Periodically, CPU 1103 sends reports of leakage detection results to server 101 via wireless modem 1102.

Referring now to FIG. 17, there is shown a series of time diagrams illustrating cross-correlation leakage detection and time delay measurement in processor 1114. A OFDM signal 1201 is formed by a CMTS and presented at an output of the CMTS at a moment in time Txi 1207 (first time diagram). Signal 1201 has M number of symbols. Signal 1201 has a duration of M number of symbols with cyclic prefixes. Eight of the symbols are associated with the PLC preamble and PLC subcarriers and the remaining symbols (M–8) are associated with the predefined continuous pilot subcarriers. Signal 1201 travels through HFC network 103 and is leaked from network 103 at some point in the coaxial cable portion of network 103. Signal 1201 then travels off-air and is received by leakage detector 102 (FIG. 16). Signal 1201 appears at the input of leakage detector 102 after a time delay T. This delayed signal is shown in the second time diagram of FIG. 17, as a leakage signal 1202. Notice from the second time diagram that signal 1202 has shifted in time by a time delay T relative to signal 1201. Time delay T represents the propagation time of signal 1201 from its originating CMTS 104 to the leak point in HFC network 103, plus the off-air propagation time from the leak to leak detector 102.

Referring now to the third time diagram in FIG. 17, at moment Txi 1207, processor 1114 starts to calculate the cross-correlation function between samples of leakage signal 1202 and reference samples 1203 of a signature (obtained from CPU 1103). This time diagram shows the actual initial alignment (in time) of reference samples 1203 relative to the samples of leakage signal 1202, at the start of the cross-correlation process (Txi 1207). Also shown are delayed versions, 1203', 1203" and 1203''', of reference samples 1203. These delayed versions represent reference samples 1203 delayed by different delay steps (or "channels") in the cross-correlation performed by processor 1114. The delay steps can be defined as n/F, for n=0 to N, where F is preferably the frequency of the common GPS clock used in processor 1114. For a 3 MHz baseband leakage signal at the output of down-converter 1112, F is preferably chosen to be 12.8 MHz (as previously discussed). Version 1203' represents reference samples 1203 delayed by a delay "x" (or n/F). Version 1203" represents reference samples 1203 delayed by a delay T for purposes of illustration (T being the propagation delay of signal 1202). Lastly, version 1203''' represents reference samples 1203 delayed by 800 microseconds, which is the maximum delay step in the cross-correlation (or N/F). The maximum delay step is chosen to be 800 microseconds because this delay is generally understood to be the maximum allowed time delay of a signal between a CMTS and a cable modem in an HFC network. In practice, however, the actual time delay between a CMTS and a cable modem is much less than 800 microseconds. Thus, the selection of 800 microseconds, as a maximum delay, substantially ensures that leakage signal 1202 will be detected in the cross-correlation.

Referring now to the fourth time diagram in FIG. 17, there is shown a cross-correlation function 1206 containing a peak 1208. Function 1206 is the result of a coherent cross-correlation between reference samples 1203 and coherently generated samples of baseband leakage signal 1202. In this embodiment, the cross-correlation is considered coherent because (1) the cross-correlation process is started at Txi, which is derived from and synchronized with a CMTS timestamp (Tcmts) on a periodic basis (e.g., once per day, as previously described), and (2) both sets of samples (reference and baseband leakage signal samples) are created at the same sample rate using clocks that are synchronized to a common standard clock (e.g., GPS clock). Looking again at FIG. 17, if peak 1208 exceeds a threshold 1210, then CPU 1103 makes a decision that leak signal 1202 has been detected. CPU 1103 then measures a time delay (e.g., time delay T in FIG. 17) associated with signal 1202 based on the position of peak 1208 relative to a zero point 1209 of function 1206. Zero point 1209 corresponds to the start moment Txi of triggering processor 1114. Zero point 1209 appears just after the accumulation of reference samples 1203, as shown by a vertical dotted line 1211, between the third and fourth time diagrams. In this way, the center of peak 1208 appears at time delay T (i.e., total propagation delay of signal 1202), measured relative to zero point 1209.

The measured time delay T, along with at least two other time delays measured at two other different geographic coordinate positions of leakage detector 102, are then used to locate the source of the leak by employing a TDOA algorithm. Location of the leak may also be accomplished by the network database method, in which case only a single time delay (e.g., time delay T in FIG. 17) is required. Both methods of leakage location are disclosed in U.S. Pat. No. 8,456,530, which is incorporated herein by reference.

In the case where the CMTS's 104 does not generate a timestamp (Tcmts), the moment of starting the triggering of processor 1114 may be arbitrarily selected, but the period of triggering should match or be equal to the period of the signal used for leakage detection. In one example, the signal is the PLC signal and the period should be equal to the PLC period Tplc. Recall, Tplc=(2560 microseconds+128 Tcp) for 4K FFT mode and (5120 microseconds+128 Tcp) for 8K FFT mode. Also, the cross-correlation function must be calculated over the full PLC period Tplc, not just a maximum time delay of a signal propagating through HFC network 103 (e.g., 800 microseconds) as in FIG. 17. Extending the cross-correlation to the full PLC period will, in most cases, ensure that any delayed leak signal will be detected (during the PLC period). It is possible, in some cases, that the triggering moment will occur in the middle of receiving a leak signal (PLC signal), but this is not very likely. Even in such a worse case, the peak of the cross-correlation function would be reduced, at most, by 6 dB.

In the above case where a timestamp is not generated by the CMTS's, the actual time delay T of signal 1202 is not measured, but the peak of the cross-correlation function will appear at a particular point in the function for a particular geographic location of leakage detector 102. As leakage detector 102 moves to a new geographic location and detects leakage signal 1202 at the new position, the point at which the cross-correlation peak appears is likely to change, representing a relative change in time delay of the signal. This relative change makes it possible to calculate time differences of arrival of the leakage signal. Thus, a TDOA algorithm is suited for determining the location of the leak in this case.

In an alternative embodiment, the cross-correlation calculation can be performed in the frequency domain by a multiplication operation (as is well-known in the art), where the time delay (of the OFDM leakage signal) can be directly obtained from the result. Alternatively, the frequency domain result can be converted back into the time domain by an Inverse Fast Fourier Transform (IFFT) operation to construct the cross-correlation function. For the purposes of this description and the claims, the term "cross-correlation" is intended to encompass (without limitation) both the time domain and frequency domain approaches discussed herein.

To increase the sensitivity of detection of an OFDM leakage signal, processor 1114 coherently accumulates a number (N) of signal pulses (over N Tplc periods) from the M symbols in the leakage signal used for leakage detection (FIG. 17). For example, if processor 1114 accumulates N=16 signal pulses from the M symbols (i.e., the symbols are accumulated 16 times), then this would increase the sensitivity of detection by approximately 12 dB. The number N of accumulations presently contemplated is 16, 32 or more. Coherent accumulation of signal samples or pulses in a cross-correlation processor for leakage detection is described in detail in U.S. Pat. No. 8,456,530 (see column 16, lines 8-32; FIG. 8; and column 23, line 54 to column 24, line 9).

The above embodiments of the present invention primarily concern the scenario where a service vehicle equipped with a leakage detector patrols the different CMTS service areas. However, there is second scenario to consider. It concerns the final pinpointing of the leak, where a technician leaves the service vehicle with a leakage level meter and ultimately walks to the leak, guided by the readings of the meter. In this second scenario, it is difficult to use time delay to search for a leak, because of the typically short distances to the leaks and the normal drift of the synchronizing reference clock during the search. Thus, an alternative embodiment has been devised, which uses a directional antenna and a leakage level meter. In this embodiment, the cross-correlation processing involves a single (or a few) pilot subcarrier(s) and the processing is done in the frequency domain. The meter may be configured as shown in FIG. 16, except that leakage antenna 1109 is specified as a directional antenna and cross-correlation processor 1114 may be specified to perform the cross-correlation in the frequency domain. More specifically, in this embodiment, processor 1114 performs a fast Fourier transform (FFT) function, a spectrum multiplication function, and an inverse fast Fourier transform (IFFT) function. These functions, in this order, carry out an operation equivalent to a cross-correlation in the time domain. Processor 1114 is implemented using a FPGA. Thus, the FPGA can be easily re-programmed to implement the FFT, multiplication, and IFFT functions for this embodiment.

In the above alternative embodiment, the leakage signal to be detected (signal 1202) is a pilot subcarrier or a few pilot subcarriers of an OFDM signal. The OFDM signatures created by server 101 comprise the same pilot subcarrier or few pilot subcarriers. The signatures include reference samples of the pilot subcarrier signal(s). The leakage signal is received, down-converted, and digitized in the same way as described with respect to the original embodiment and FIG. 16. The signatures (including reference samples) are stored in the leakage level meter in the same manner as described with respect to the original embodiment. The leakage samples and reference samples are then received by re-configured processor 1114, where the frequency spectrums of both are calculated under the FFT function. The spectrums are then multiplied together under the spectrum multiplication function, and the result is converted to the time domain under the IFFT function. The result is equivalent to the cross-correlation function shown in FIG. 17.

A variation of the above alternative embodiment is simply to re-configure processor 1114 as an FFT processor, where the spectrum of the leakage signal is calculated and then analyzed in CPU 1103. In this variation, the leakage signal, again, would be a single or few pilot subcarriers. In this variation, the spectrum would be a priori known by CPU 1103, and thus if the leakage signal spectrum matched the known spectrum, a decision would be made that the leakage signal was detected. Once this is decided, the amplitude of the spectral components of the leakage signal are measured to provide a level reading. Calculating an FFT for a single or few subcarrier(s) allows for a dramatically reduced bandwidth of the receiver channel, from a few MHz to a few kHz. The reduced bandwidth would also increase immunity from interfering signals. For leak detection validation, it is enough to know the center frequency of the pilot subcarrier(s) and/or its offset from a next pilot subcarrier or adjacent pilot subcarriers. A pilot subcarrier is chosen here because it is boosted by 6 dB (as previously discussed), it is continuously present in each symbol, it has a stable initial phase in each symbol, and its spectrum has a discrete and stable form. These factors allow for effective detection and identification by CPU 1103. It should be noted that accurate triggering time (such as with Txi) is not needed. Thus, the design of the leakage level meter can be simple and low cost.

In the case where the pilot subcarriers are stable and fixed within a CMTS service area, the center frequencies of the pilot subcarriers may be pre-programmed in CPU 1103. This would further simplify the meter design by eliminating wireless communications (i.e., wireless modem 1102) with a data server. This simplification would further reduce the cost of the meter, making it even more suitable for a home installer/home certification application.

Continuous Pilot Subcarrier (CPS) Embodiment Using Dominant Harmonic(s) for Detection A further embodiment of the present invention concerns detection of leakage of an OFDM signal from an HFC network by focusing on a continuous pilot subcarrier ("CPS") of the OFDM signal and using an FFT detector or FFT detection algorithm (e.g., an FFT spectrum analyzer). As an example, the following description refers to OFDM signals and CPS's as specified in the DOCSIS 3.1 specification. This embodiment ("CPS embodiment") may involve the scenario where a service vehicle is equipped with a leakage detector and patrols the different CMTS service areas, as in the first embodiment. However, the CPS embodiment is not so limited. It may also be employed in the scenario where the leak is to be pinpointed by a technician who leaves the service vehicle with a leakage detector and ultimately walks to the leak, guided by the readings of the detector.

The CPS embodiment is preferred in cases where the leak to be detected is in a frequency band outside the spectrum of the PLC subcarriers. For example, it may be desirable to detect leaks in the LTE band of frequencies, as previously mentioned. However, the frequencies of the PLC subcarriers may not be within an LTE band. The PLC subcarriers may be placed as much as 100 MHz or more from the LTE uplink and downlink frequencies to prevent interference with cable modems. In such a case, using the PLC subcarriers to detect or measure a leak at the LTE band is not likely to yield accurate results. However, the OFDM signal may have a very wide bandwidth (e.g., 192 MHz) and contain a number of CPS's distributed as uniformly as possible over its bandwidth (e.g., 48 CPS's distributed every 4 MHz over an OFDM bandwidth of 192 MHz). Even with a 100 MHz offset of the PLC subcarriers from the LTE band, a 192 MHz bandwidth OFDM signal may still overlap the LTE band. Thus, a CPS or CPS's of the OFDM signal (preferably its/their harmonics) may be located within the LTE band and used to accurately detect and measure the level of the OFDM signal leak in the LTE band.

The CPS embodiment is also preferred in cases where leak detection is performed in or around a subscriber's home (e.g., a home certification). In this case, the TDOA method of locating a leak is not required; thus, a less complicated and less expensive leak detector can be used, i.e., an FFT detector configured to detect a CPS or preferably its dominant harmonic. For example, the FFT detector can be an FFT spectrum analyzer having a very narrow resolution bandwidth (RBW) and a down-converter controlled by logic or a computer for tuning the down-converter to receive only a dominant harmonic of the CPS. The CPS embodiment may further include a validation step or steps, to confirm whether the detected harmonic is from an actual ODFM signal leaked from an HFC network.

In the preferred form of the CPS embodiment, dominant harmonics of a CPS or CPS's are utilized rather than the CPS or CPS's themselves. The dominant harmonics are used because they are continuous wave (CW) signals, which are easy to detect using an FFT spectrum analyzer detector or detection algorithm. If a CPS (with its number of harmonics) is to be detected, then a more complicated detector or detection algorithm is required.

In general, the method of detecting dominant harmonics of CPS's is based on retrieving signal parameters about the OFDM signal and the CPS's of the OFDM signal, from each CMTS serving a service area in the HFC network. Then, a signature concerning the dominant harmonics of one or more or all CPS's is calculated and formed for each CMTS service area (see FIG. 23). In the CPS embodiment, the signature ("CPS signature") is different from the signature of the previous embodiments. One difference is the absence of reference samples in the CPS signature. No content of the CPS signature is cross-correlated with a detected leakage signal as in the previous embodiment. Rather, the CPS signature contains information used for (1) tuning the leakage detector to receive a dominant harmonic(s) of a selected CPS, (2) validating that the harmonic(s) has been detected and is from an OFDM leakage signal, and (3) calculating the leakage level of an OFDM signal. The CPS signature may be calculated and formed in the leakage detector hardware or in leakage data server 101 (FIG. 1).

Figure 18:
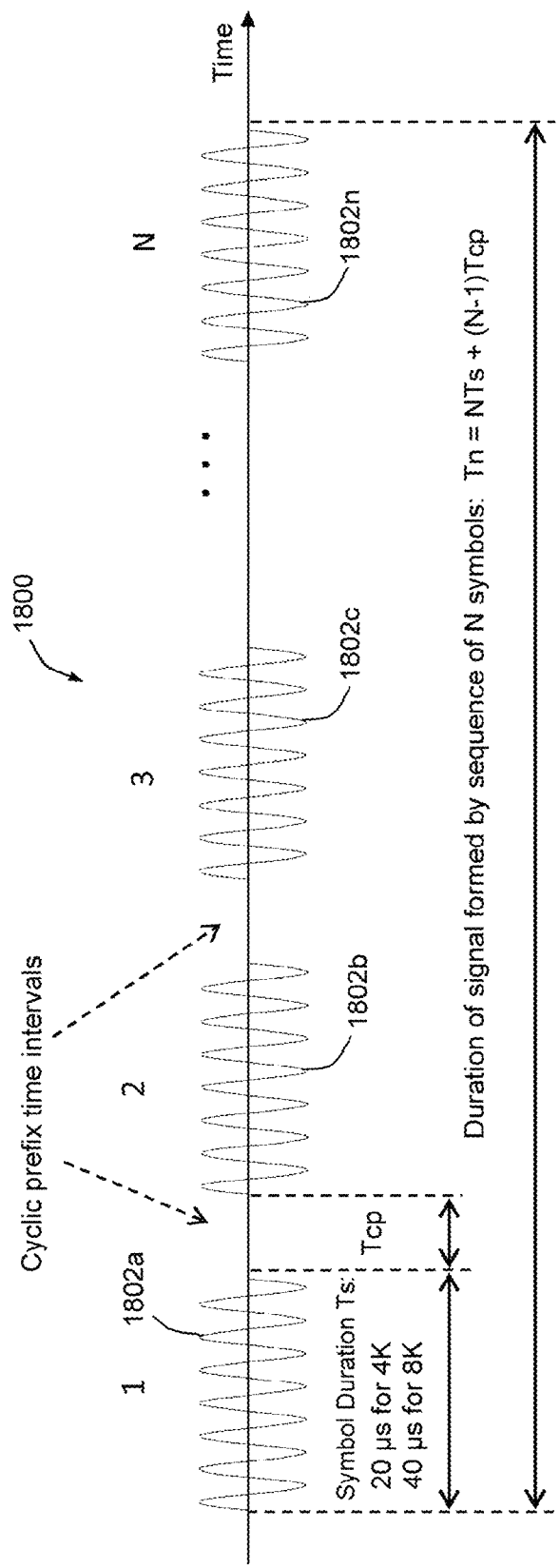
FIG. 18 illustrates a continuous pilot subcarrier (CPS) signal in the time domain, for one of the subcarrier locations in an OFDM signal (or symbol)

Before the CPS embodiment is described in detail, an analysis of a CPS in a DOCSIS 3.1 OFDM signal is presented. FIG. 18 shows a CPS signal 1800 in the time domain. Signal 1800 includes a periodic sequence of N coherent pulses 1802a-1802n, each with a stable initial phase of 0 or 180 degrees, and each having an OFDM symbol duration Ts. Signal 1800 has a symbol period of Ts+Tcp, where Tcp is the cyclic prefix duration. Signal 1800 has a total signal duration Tn. The frequency of each pulse 1802a-1802n is equal to the center frequency of the CPS after IDFT:

$$f_{piloti} = (\text{CPS number ``}i\text{''}) \times f_{sub} \quad (1)$$

where fsub equals 50 kHz for 4K FFT mode and 25 kHz for 8K FFT mode, and the CPS number "i" is an integer index number assigned to each CPS in an OFDM signal (or symbol) under the DOCSIS 3.1 specification. It is well known that the spectrum of CPS signal 1800 in FIG. 18 looks like a number of discrete harmonics, while the spectrum of a modulated data subcarrier of the OFDM signal looks like a random noise signal.

Figure 19:
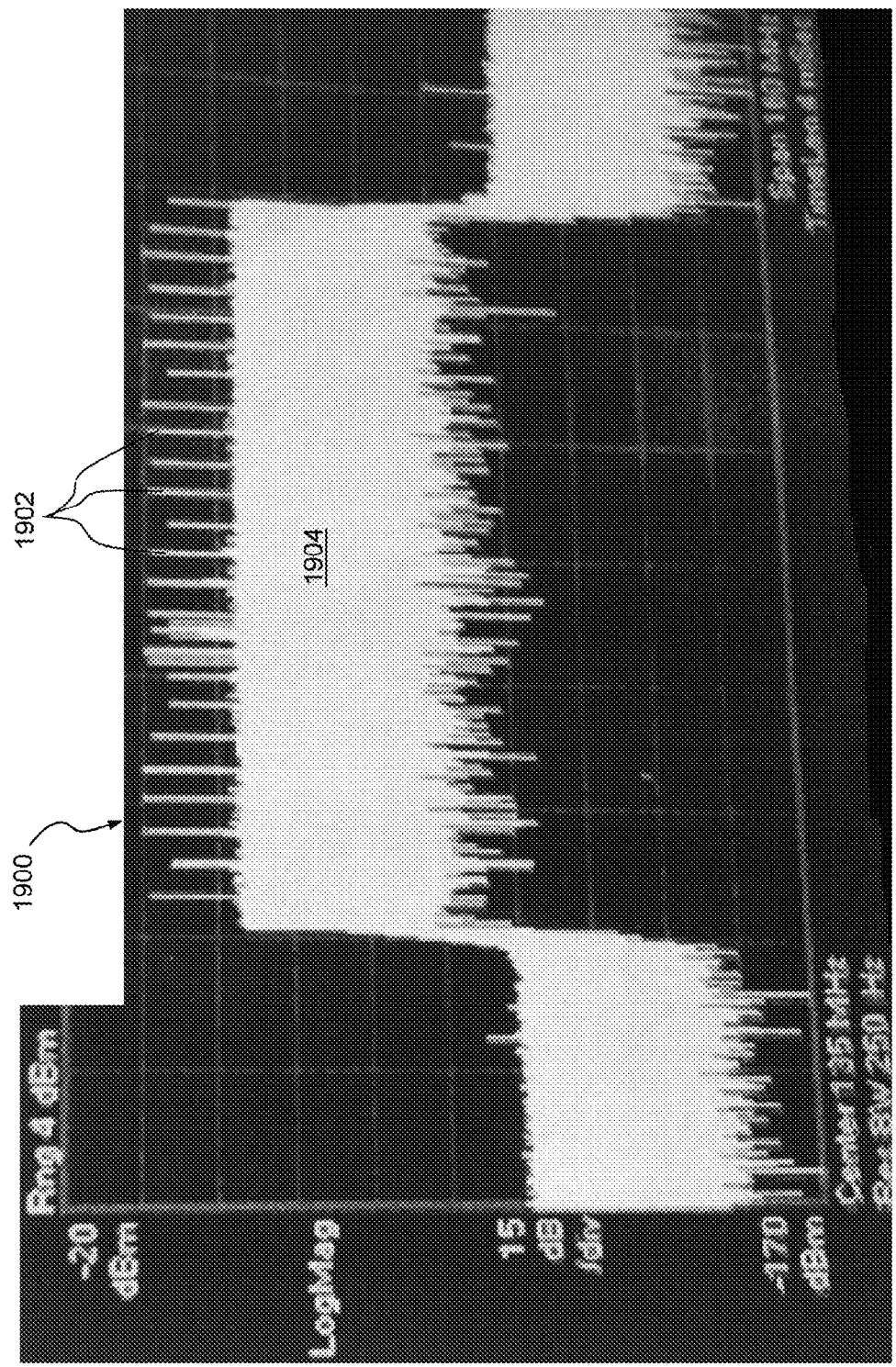
FIG. 19 is a spectrum plot of an actual DOCSIS 3.1 OFDM signal with a bandwidth of 96 MHz, measured with a spectrum analyzer having a resolution bandwidth (RBW)= 250 Hz.

FIG. 19 shows an actual spectrum of a DOCSIS 3.1 OFDM signal 1900 with a bandwidth of 96 MHz, measured with a spectrum analyzer having a RBW=250 Hz. Signal spectrum 1900 contains discrete harmonics 1902, which are attributed to the CPS's of the OFDM signal. Harmonics 1902 are the type of signals sought to be detected and measured for leakage detection and leakage level measurement, in accordance with the CPS embodiment of the present invention. Signal spectrum 1900 also includes a flat spectral component 1904, formed by the modulated data subcarriers of the OFDM signal. Component 1904 resembles a random noise signal. If the RBW of the spectrum analyzer is much less than the bandwidth of one subcarrier (25 or 50 kHz), e.g., RBW=10 to 250 Hz, then discrete harmonics 1902 will be "visible" (or detectable) under spectral component 1904. Therefore, it is possible to use one or more of harmonics 1902 for detecting a leak of an OFDM signal.

The energy of the harmonics of a CPS is low compared with the energy of the OFDM signal. Thus, good sensitivity is required to detect the harmonics. To achieve adequate sensitivity, a very narrow RBW is used in the FFT detector (e.g., FPGA 1114 in FIG. 16), such as only a few Hz (e.g., 1-10 Hz). However, the detector should be fast enough to detect leaks a few times per second (e.g., twice per second). Obviously, to satisfy both the RBW and speed requirements, the baseband of the detector should be narrow enough for a reasonable FFT mode and RBW. For example, if a 2K FFT mode is used in an FFT detector with a 10 Hz RBW, then there will be a calculation of 2048 frequencies in the spectral domain requiring a total bandwidth of 2048×10 Hz=20.48 kHz. This total bandwidth pertains to a complex spectrum. Thus, half of this bandwidth, or approximately 10 kHz, is selected as the baseband bandwidth of the FFT detector. But, an FFT detector with such a narrow baseband and only a few Hz RBW has the following limitations:

1. The frequency of the detected CPS harmonic should be known with high enough accuracy for correct tuning of the detector's RF receiver.
2. Due to the good sensitivity of the FFT detector, interfering carriers may be present in the spectrum and detected as false leaks.

To overcome the above problems, the present invention calculates and forms CPS signatures for the dominant harmonic or harmonics of one or more or all CPS's (e.g., two adjacent CPS's), and uses information from the CPS signatures to validate or confirm that the detected harmonics are from an actual OFDM signal leaked from an HFC network.

Figure 20A:
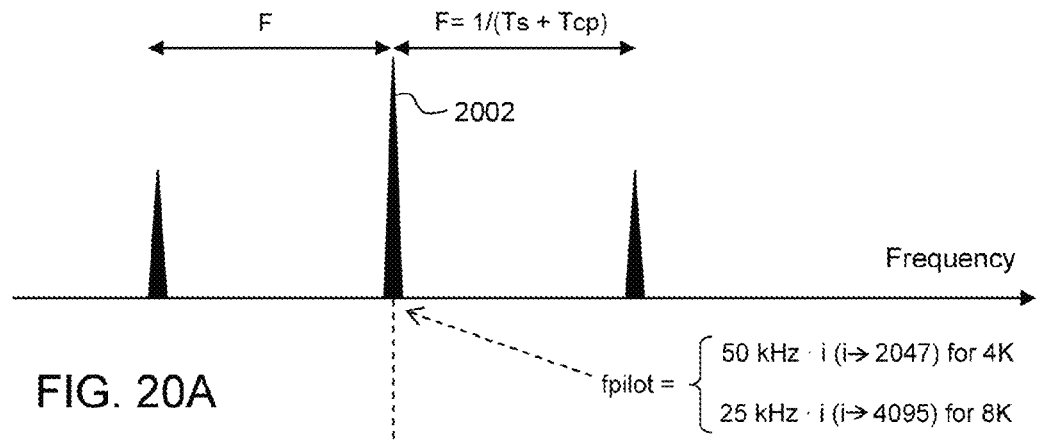
FIGS. 20A-20C illustrates three possible scenarios of the locations of the dominant harmonic(s) of the CPS signal of FIG. 18, relative to the center frequency of the CPS signal, where
Figure 20B:
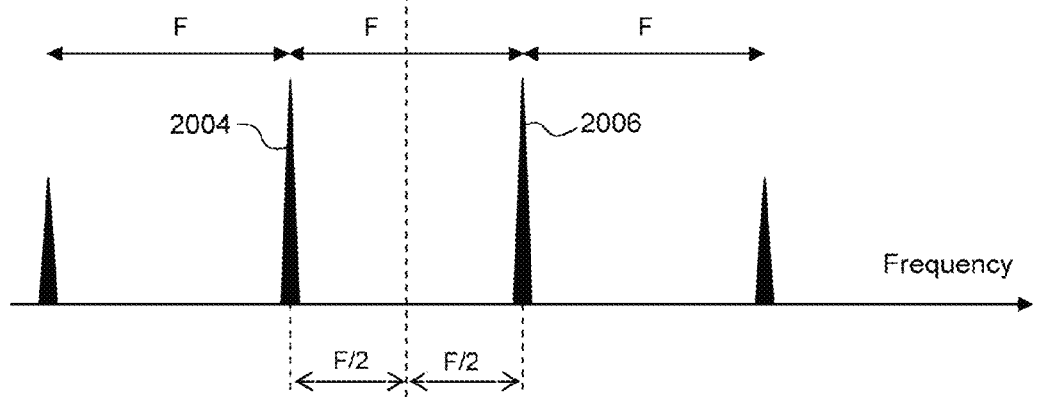
Figure 20C:
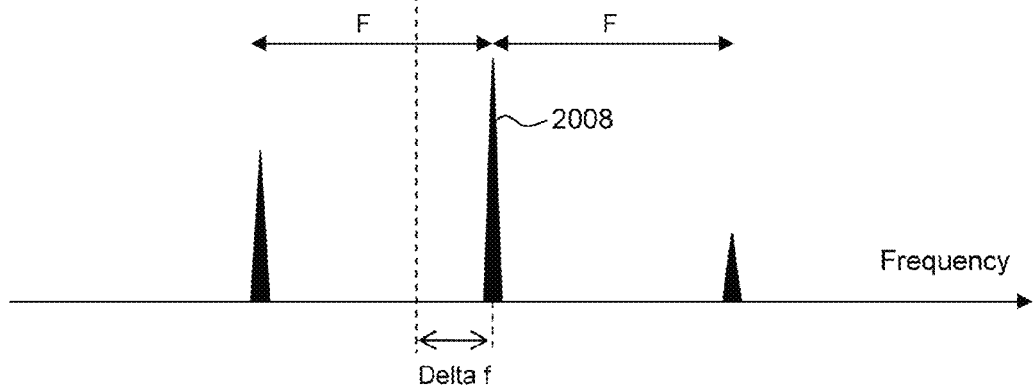

An exemplary CPS signature may involve three key parameters: (1) the RF frequency of a dominant harmonic or harmonics of each CPS of an OFDM signal (or selected CPS's); (2) calculated frequency offsets between dominant harmonics of adjacent pairs of CPS's; and (3) the relative amplitude of the dominant harmonic(s) of each CPS, relative to the total energy of the CPS. The first parameter is used to tune the down-converter of the detector's receiver and for preliminary validation or confirmation that the detected harmonic is leakage of an actual OFDM signal. The second parameter is used for further validation that the detected harmonic is from an actual OFDM leakage signal. The third parameter is used to calculate the OFDM leakage level based on a measured level of the dominant harmonic(s) of a CPS. These parameters are explained further below. The calculation of the CPS signature depends on an analysis of the harmonic(s) of the CPS's. Three scenarios for the dominant harmonic(s) of a CPS (e.g., signal 1800 in FIG. 18) are shown in FIGS. 20A-20C. These scenarios depend on the FFT mode, CPS number "i" in the OFDM signal (or symbol), and the cyclic prefix duration Tcp. The frequency spacing F between harmonics of a CPS is equal to the inverse of the symbol period (Ts+Tcp) of the CPS, i.e., F=1/(Ts+Tcp). FIG. 20A shows the scenario of one dominant harmonic 2002 located at the center frequency (fpilot) of the CPS. This scenario will occur when there is an integer number of (sine wave) periods of the pulses of the CPS that are within the cyclic prefix duration Tcp. The sine wave period is defined as ppilot=1/fpilot. For example, Tcp=5 microseconds and the CPS frequency fpilot=10 MHz; thus ppilot=1/10 MHz=0.1 microseconds, and Tcp/ppilot=5/0.1=50, which is an integer number representing 50 periods within Tcp. Therefore, this 10 MHz CPS would produce the harmonic scenario of FIG. 20A. In the scenario of FIG. 20A, the level of the dominant harmonic will be at its maximum.

FIG. 20B shows the opposite scenario, where there are two dominant harmonics 2004 and 2006 having a minimum level and a maximum offset F/2 from the center frequency (fpilot) of the CPS. This will occur when an odd integer number of half periods (ppilot/2) of the CPS is within the cyclic prefix duration Tcp, or Tcp/(ppilot/2)=odd integer number.

For example, in the 4K FFT mode (50 kHz subcarrier spacing) with Tcp=5 microseconds, and CPS number "i"=10, then fpilot=i·50 kHz=500 kHz and ppilot=2 microseconds. Therefore, Tcp/(ppilot/2)=5/(2/2)=5, which is an odd integer number representing 5 half periods within Tcp.

FIG. 20C shows an intermediate case, where one dominant harmonic 2008 is offset from the center frequency (fpilot) of the CPS by a frequency value, Delta f, where Delta f is less than the maximum offset F/2. Any of the scenarios shown in FIGS. 20A-20C may be in the CPS signature for leakage detection and level measurement. The primary criterion for selecting a CPS from the CPS signature is whether the frequency of the harmonic(s) to be detected is close enough to or within the frequency band of the anticipated leakage signal (for accurate detection and level measurement).

Figure 21:
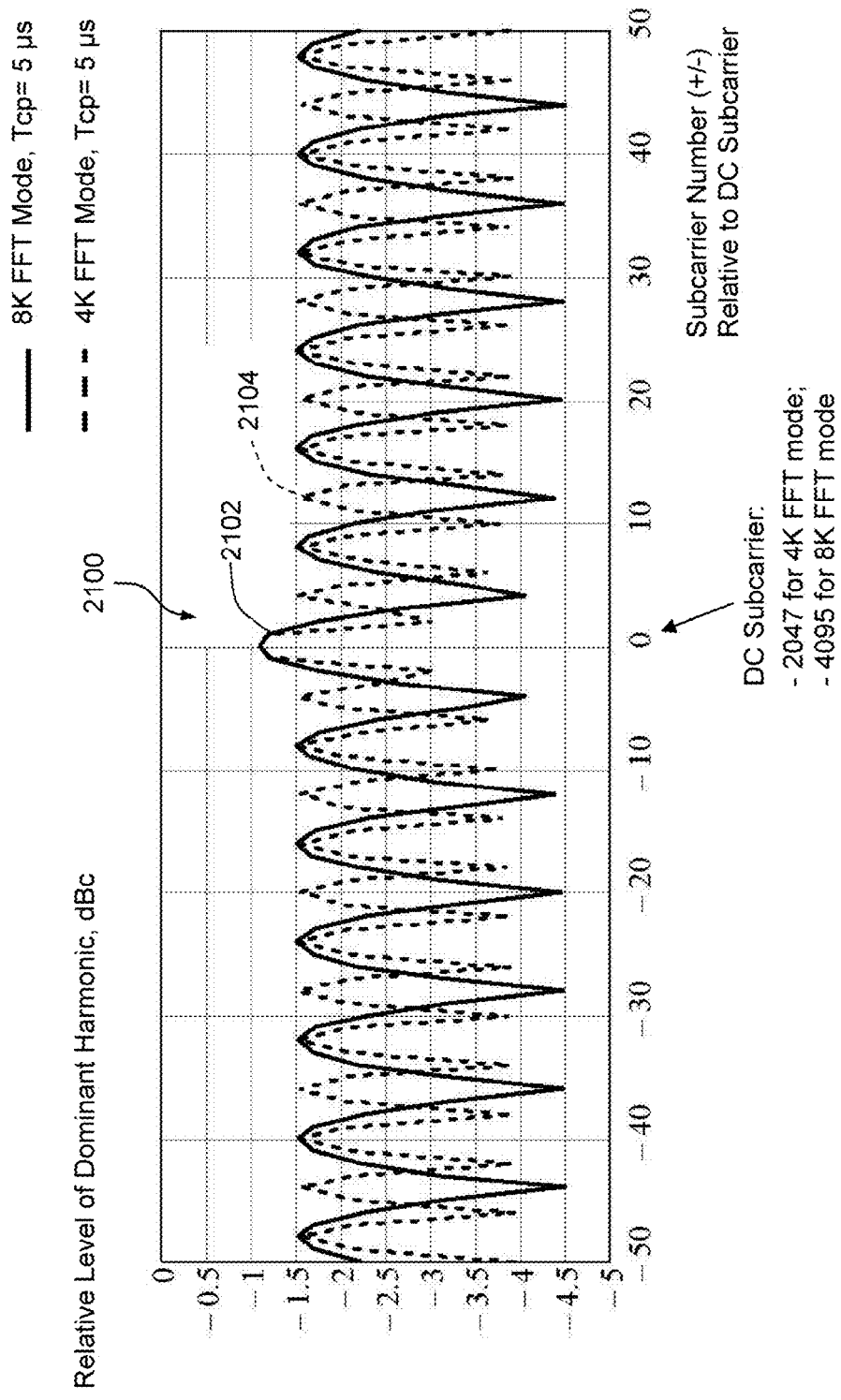
FIG. 21 is a graph of the relative amplitude (or level) in dBc of a dominant harmonic of a CPS signal versus the pilot subcarrier number of the CPS signal in an OFDM symbol, for the 8K FFT mode (solid line) and the 4K FFT mode (broken line) and a cyclic prefix duration of 5 microseconds.

FIG. 21 shows a graph 2100 of relative amplitude (or level) of a dominant CPS harmonic versus the CPS number "i" in the OFDM signal (or symbol). The relative amplitude values plotted in graph 2100 were calculated in dBc (or decibels relative to the carrier), and each value represents the amplitude of a dominant harmonic relative to the total energy of the CPS associated with that harmonic. Graph 2100 is centered at a DC subcarrier and extends 50 subcarriers in the plus and minus directions. Graph 2100 includes a solid line plot 2102 and a broken line plot 2104. Plot 2102 represents the relative amplitude of the dominant harmonic in the 8K FFT mode (Tcp=5 microseconds), and plot 2104 represents the relative amplitude of the dominant harmonic in the 4K FFT mode (Tcp=5 microseconds). Plots 2102 and 2104 are periodic functions that continue in like manner over the full set of subcarriers (or CPS numbers) in the OFDM signal (or symbol). Plots 2102 and 2104 are symmetric about the DC subcarrier. The period of plots 2102, 2104 are dependent on Tcp. For example, as explained with respect to FIG. 20A, the maximum of the dominant harmonic occurs under the condition of Tcp/ppilot=integer number. Tcp/ppilot=Tcp·(fpilot)=Tcp(i·fsub). With Tcp=5 microseconds and 8K FFT mode, the period of the function of plot 2102 is 8 subcarriers, because Tcp×(i)×(fsub)=(5×10^−6)×(8)×(0.025×10^6)=1, where 1 is the minimum integer value. If Tcp=2 microseconds, the period of plot 2102 would be 20 subcarriers, because 2×20×0.025=1. The relative amplitude or level of the dominant harmonic (RLHarm i) is used to calculate a level of the OFDM leakage signal.

The frequency offset of the dominant harmonic from the center frequency of the CPS is defined by an equation (2):

$$\text{Delta } f(\text{Hz})=1/(Ts+Tcp)\text{round}(fpilot(Ts+Tcp))-fpilot \qquad (2)$$

where fpilot is the center frequency of the CPS after IDFT (equation (1)), Ts equals 20 microseconds for the 4K FFT mode and 40 microseconds for the 8K FFT mode, and "round" means rounding to an integer. As an example, assume the following parameters: Ts=20 microseconds (4K FFT mode); Tcp=5 microseconds; and fpilot=12.5 MHz. Then, $$\begin{aligned}\text{Delta } f(\text{Hz}) &= 10\wedge6/(20+5)\text{ round}(12.5(20+5))-12.5\times10\wedge6\text{ Hz}\\&=40{,}000\text{ round }(312.50)-12.5\times10\wedge6\text{ Hz}\\&=40{,}000\times313-12.5\times10\wedge6\text{ Hz}\\&=20{,}000\text{ Hz or }20\text{ kHz}.\end{aligned}$$

Figure 22:
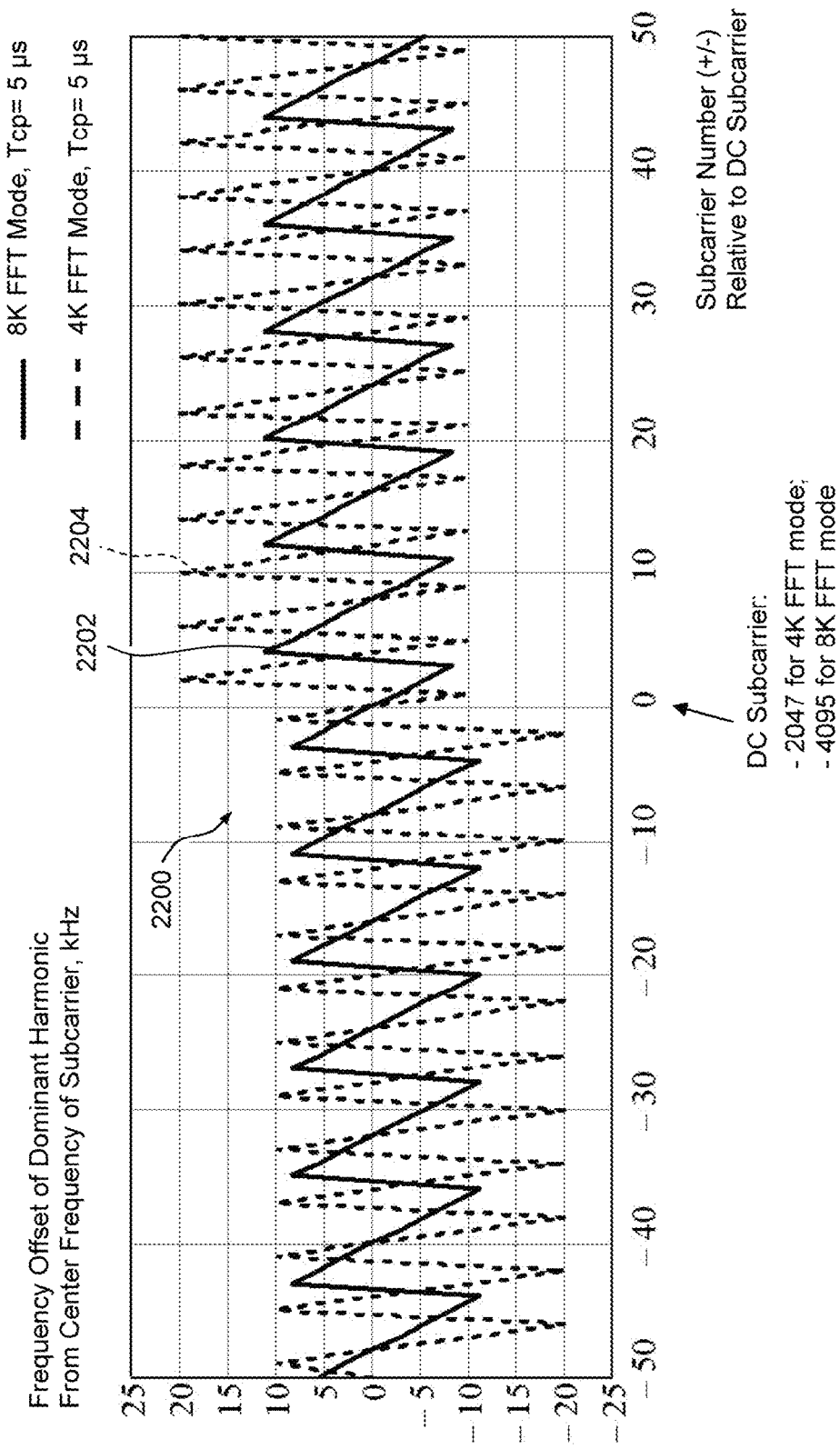
FIG. 22 is a graph of the frequency offset Delta f, in kHz, of the dominant harmonic from the center frequency of the CPS signal versus the pilot subcarrier number in the OFDM symbol, for the 8K FFT mode (solid line) and the 4K FFT mode (broken line) and a cyclic prefix duration of 5 microseconds.

FIG. 22 shows a graph 2200 of the frequency offset Delta f, in kHz, versus the pilot CPS number "i" in the OFDM signal (or symbol). Graph 2200 is centered at the DC subcarrier and extends 50 subcarriers in the plus and minus directions. Graph 2200 includes a solid line plot 2202 and a broken line plot 2204. Plot 2202 represents Delta f in the 8K FFT mode (Tcp=5 microseconds) and plot 2204 represents Delta f in the 4K FFT mode (Tcp=5 microseconds). Plots 2202 and 2204 are periodic functions that continue in like manner over the full set of subcarriers (or CPS numbers) in the OFDM signal (or symbol). Plots 2202 and 2204 are asymmetric about the DC subcarrier. The period of plots 2202, 2204 are also dependent on Tcp. For example, as explained with respect to FIG. 20B, the maximum frequency offset (F/2) of a dominant harmonic occurs under the condition of Tcp/(ppilot/2)=odd integer number of half periods. Tcp/(ppilot/2)=2 Tcp/ppilot=2 Tcp·(fpilot)=2 Tcp(i·fsub). With Tcp=5 microseconds and 4K FFT mode, the period of plot 2204 is two half periods of 2 subcarriers each (or 4 subcarriers), because 2 Tcp×(i)×(fsub)=(2×5×10^−6)×(2)×(0.050×10^6)=1, where 1 is the minimum odd integer number of half periods. Delta f is used to locate the frequency of the dominant harmonic relative to the center frequency of the CPS.

Figure 23:
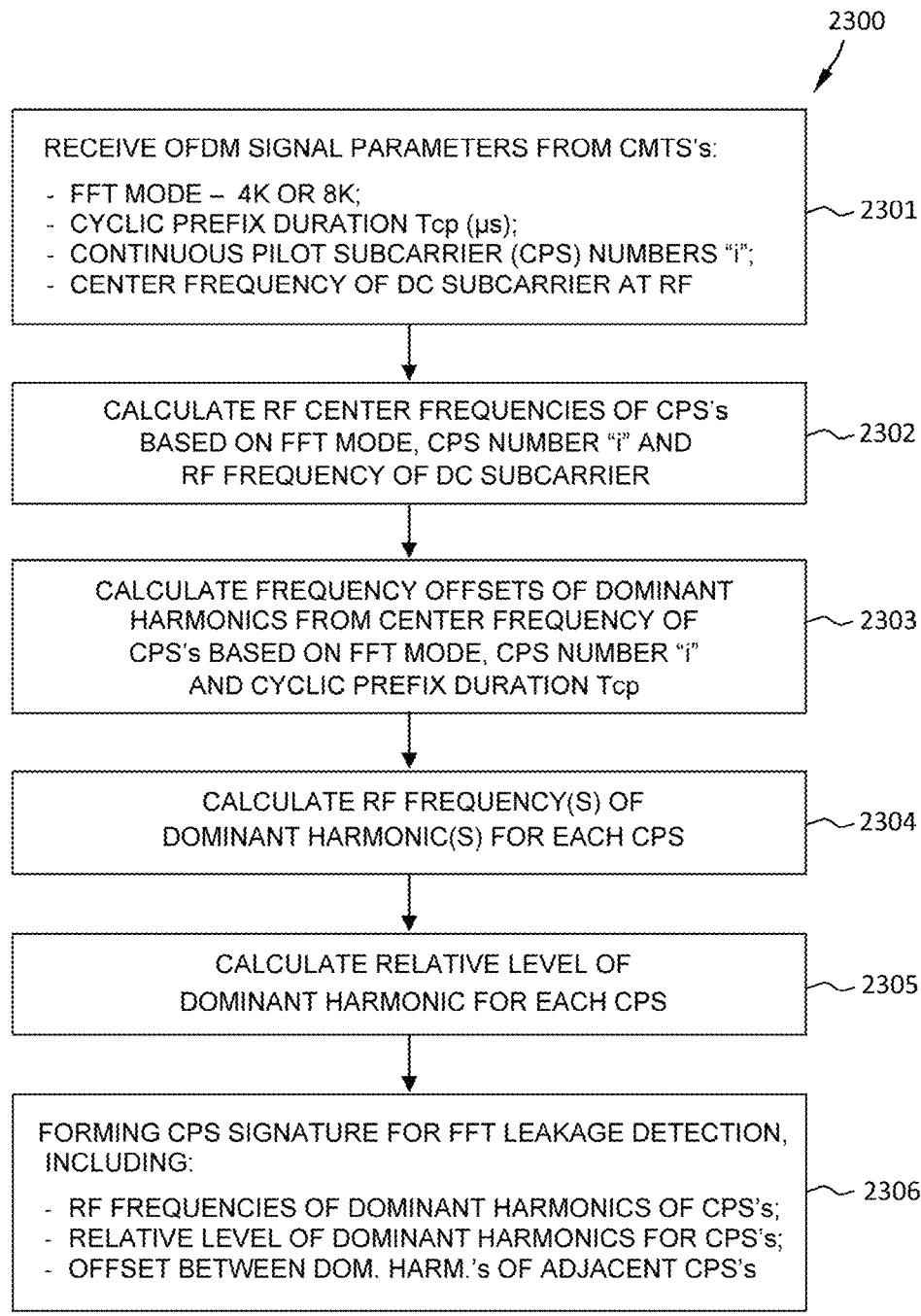
FIG. 23 is a flow diagram outlining a method of creating a signature for the detection of a dominant harmonic(s) of a CPS signal of an OFDM signal.

FIG. 23 shows a flow diagram outlining a method 2300 of forming a CPS signature for the detection of dominant harmonics of CPS's in an OFDM signal. In a first step 2301, data server 101 (FIG. 1) retrieves from all CMTS's 104 the following signal parameters: the FFT mode (4K or 8K); cyclic prefix duration Tcp (μs); the CPS numbers "i"; and the center frequency of the DC subcarrier at RF (i.e., after up-converting the OFDM signal to the RF band).

In a second step 2302 (FIG. 23), server 101 calculates the center frequency RFpilot i of each CPS in the RF band (for each CPS number "i") by using the equations:

$$RFpilot\ i = \begin{cases} 50\ \text{kHz} \cdot i(i = 1\ \text{to}\ 2047) + F\ \text{dc} = (fpilot\ i + F\ \text{dc}), & \text{for } 4K\ FFT\ \text{mode} \\ 25\ \text{kHz} \cdot i(i = 1\ \text{to}\ 4095) + F\ \text{dc} = (fpilot\ i + F\ \text{dc}), & \text{for } 8K\ FFT\ \text{mode} \end{cases}$$

where "i" is the CPS number in the OFDM signal (or symbol) and F dc is the center frequency of the DC subcarrier at RF (both obtained from CMTS). The CPS numbers utilized in this calculation may only be a subset of a complete set of CPS numbers (e.g., 2047 or 4095) for an OFDM signal (or symbol), where the subset of numbers are selected to be close to or within the frequencies of the anticipated OFDM leakage signals.

In a third step 2303 (FIG. 23), server 101 uses equation (2) to calculate, for each CPS number "i", the frequency offset (Delta f i) of the dominant harmonic from the center frequency of each CPS, where the center frequency of each CPS is defined by equation (1) or:

$$fpilot\ i = \begin{cases} 50\ \text{kHz} \cdot i(i = 0\ \text{to}\ 2047) & (4K\ FFT\ \text{mode}) \\ 25\ \text{kHz} \cdot i(i = 0\ \text{to}\ 4095) & (8K\ FFT\ \text{mode}) \end{cases}$$

In a fourth step 2304, server 101 calculates the RF frequency(s) of the dominant harmonic(s) for each CPS, using the equation:

$$Fharmi = RFpiloti + Deltafi$$

Fharm i is used to determine the appropriate local oscillator (LO) signal frequency for tuning leakage detector 102 to receive and down-convert the dominant harmonic(s).

In a fifth step 2305, server 101 calculates the relative amplitude or level of the dominant harmonic(s), in dBc, for each CPS, for example, using the equation:

$$RLharmi(\text{dBc}) = 20\ \text{Log}(\text{Max}(\text{FFT}(fpiloti,Ts,Tcp,Tn))/\text{Sum}(\text{FFT}(fpiloti,Ts,Tcp,Tn))$$

where the FFT is a DFFT function of the time-domain version of the CPS (e.g., signal 1800 in FIG. 18), with parameters fpilot, Ts, Tcp, and signal duration Tn. The minimum signal duration Tn of the CPS is defined by the required RBW of the FFT leakage detector, by the relationship: Tn (sec)=1/RBW (Hz). For example, if the required RBW=10 Hz, then the minimum Tn=100 milliseconds.

In a final step 2306, server 101 forms the CPS signature for each CMTS service area, as a matrix of data files: (Fharm i; RLharm i; FOharm(i, i+1)). Fharm i and RLharm i are the RF frequency(s) and relative levels of the dominant harmonic(s), as defined above. FOharm(i, i+1) is the calculated frequency offset between dominant harmonics of adjacent CPS's (defined below) and is used to validate leakage detection (described below). The signature may also include an LO signal frequency for each dominant harmonic to be detected, where, as indicated earlier, the LO frequency is calculated from the associated RF harmonic frequency, Fharm i. As described below, the LO frequency is preferably not part of the signature, in which case it is calculated or determined in the leakage detector (e.g., in CPU 1103 of leakage detector 102; FIG. 16).

Leakage detector 102, as shown in FIGS. 1 & 16, is used as the leakage detector in the CPS embodiment of the present invention. In the CPS embodiment, FPGA 1114 is programmed as an FFT detector or processor (or FFT spectrum analyzer). Also, in the case of a home certification application, GPS time sync module 1106 (FIG. 16) can be replaced with a lower-cost temperature compensated crystal oscillator (TCXO) clock generator, to reduce the overall cost of the detector. Also for home certification applications, wireless modem 1102, antenna 1101, and local timer 1105 can be removed to reduce the cost of the detector (FIG. 16). In the home certification application, the CPS signatures for the CMTS service areas may be entered and stored manually in leakage detector 102.

The initial operation of leakage detector 102 in the CPS embodiment is essentially the same as in the first-described embodiment. Referring to FIG. 16, CPU 1103 receives CPS signatures from server 101 via wireless modem 1102 and stores them in flash memory 1104. CPU 1103 then selects a signature for the current CMTS service area based on GPS or other geo-location data. CPU 1103 then selects one of the CPS's having an RF frequency within a predefined frequency band of the leak to be detected, for example, at an LTE guard band between downlink and uplink frequencies (e.g., 717-728 MHz or 764-776 MHz). CPU 1103 then sets the frequency of local oscillator 1108 for down-converting to baseband the dominant harmonic of the selected CPS.

Figure 24:
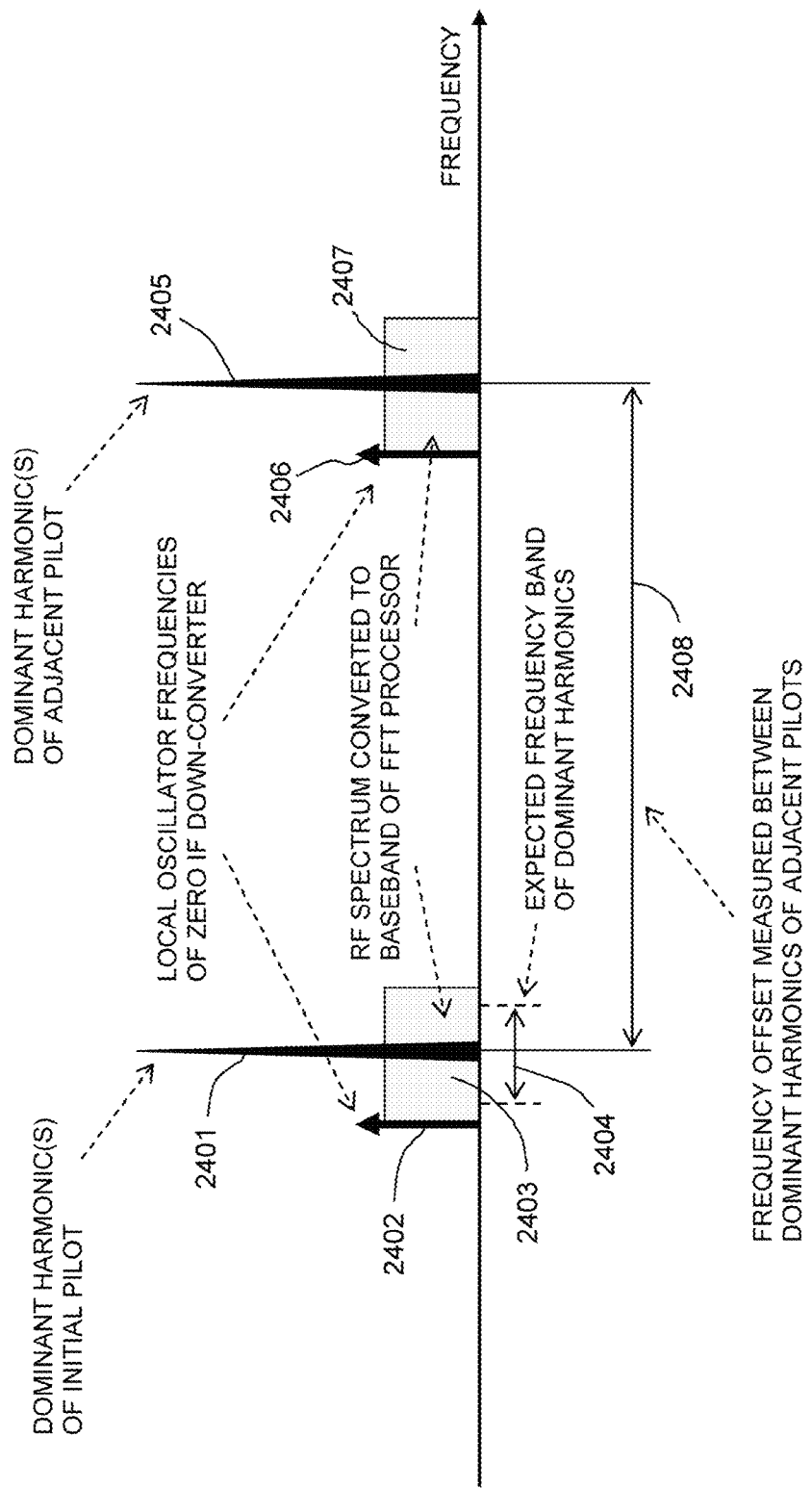
FIG. 24 illustrates part of a method for validating or confirming that the detected dominant harmonic of an initial CPS signal is from an OFDM signal leaked from an HFC network, by measuring a frequency offset between the detected dominant harmonic of the initial CPS signal and a detected dominant harmonic of an adjacent CPS signal.

FIG. 24 illustrates the frequency location of a detected dominant harmonic 2401 of a first CPS. Harmonic 2401 is located within a limited band 2403. Harmonic 2401 and other parts of an OFDM leakage signal (not shown) are received by leakage detector 102 (FIG. 16) and filtered and amplified by preselector filter 1110 and LNA 1111, respectively, before going to zero IF down-converter 1112. Shown in FIG. 24 is the frequency location of a local oscillator (LO) signal 2402 relative to harmonic 2401. LO signal 2402 is generated by LO 1108 under control of CPU 1103 (FIG. 16). Preferably, CPU 1103 computes the desired frequency for LO signal 2402 based on the RF frequency (Fharm) of harmonic 2401 (which is obtained from a CPS signature). Down-converter 1112 (FIG. 16) uses LO signal 2402 to perform a zero IF down-conversion to baseband of the RF OFDM leakage signal, including harmonic 2401 of band 2403. Preferably, the down-converted baseband has a more limited bandwidth containing band 2403 and harmonic 2401. The bandwidth of the baseband should correspond to the baseband defined for the FFT processor implemented in FPGA 1114 (FIG. 16), e.g., about 10 kHz.

With further reference to FIG. 24, LO signal 2402 is offset in frequency from harmonic 2401 by a minimized amount, but by more than half of the possible drift 2404 of harmonic 2401. Drift 2404 may be due to various factors. One factor occurs in a patrolling mode of the detector, where a Doppler shift is experienced due to the movement of the detector relative a leakage source. The Doppler shift at high frequencies (e.g., 1 GHz) is less then 100 Hz for truck speeds of 60 mph. Another factor is instability of GPS time sync module 1106 in a holdover mode or of a TCXO clock generator (in case of low-cost option for home certification). The typical accuracy of a TCXO is about $+/-10^{\wedge}-6$, which would be +/−1 kHz at 1 GHz. So, a reasonable frequency offset of LO signal 2402 from harmonic 2401 is a few kHz (e.g., 2 or 3 kHz) to prevent interference or influence of undesired spectral components at DC frequency.

Referring to FIGS. 16 & 24, the time-domain signals in the baseband version of band 2403 (including harmonic 2401) are digitized by A/D converter 1113. Then, the FFT spectrum of the time-domain baseband signals are calculated in FPGA 1114. The spectrum data from FPGA 1114 are transferred to CPU 1103, where harmonic 2401 is recognized as detected if its level is greater than a suitable threshold (e.g., relative to the noise floor) and if the frequency of harmonic 2401 is within the expected drift band 2404. As was discussed above, due to different instability factors, drift band 2404 may be approximately +/−1 kHz, and the RBW of the FFT processor will be about 10 Hz. This means that the probability of detecting some extraneous signal within drift band 2404 is high enough to be concerned about detecting a false leak.

A validation method is preferably employed to prevent false leak alarms in the CPS embodiment. The validation method includes the step of detecting a dominant harmonic 2405 (FIG. 24) of a second CPS that is adjacent to the first CPS (corresponding to harmonic 2401). The method further includes the step of measuring a frequency offset 2408 between adjacent harmonics 2401, 2405 (FIG. 24). The same GPS synchronized clock (common clock in FIG. 16) is used for detection of both harmonics 2401, 2405; thus, the frequency instability factors do not substantially affect the accuracy of measuring offset 2408. Because frequency offset 2408 can be measured accurately, this offset value can be relied upon as a robust parameter for validation of an actual OFDM leakage signal.

The preferred logic and steps of the validation method are as follows. If dominant harmonic 2401 is detected within drift band 2404, then CPU 1103 tunes local oscillator 1108 to an LO signal frequency 2406 for the detection of adjacent harmonic 2405, within a limited band 2407. The frequency of harmonic 2405 and a calculated frequency offset FOharm (i, i+1) between harmonics 2401 and 2405 are provided to CPU 1103 as part of the CPS signature received from server 101. If harmonic 2405 is detected, then CPU 1103 determines frequency offset 2408 (between detected harmonics 2401 and 2405). If the determined offset 2408 is close to (within a few Hz of) the calculated offset FOharm(i, i+1), then CPU 1103 makes a decision that detected harmonic 2401 is valid and corresponds to an actual CPS of an OFDM leakage signal.

After validating the detection of dominant harmonic 2401, CPU 1103 calculates the level of the OFDM leakage signal ("leakage level" or "level of the leak") by using the measured level of detected harmonic 2401 and the calculated relative level value for harmonic 2401, RLharm i (obtained from the signature). If the leakage level is considered measured over a 6 MHz bandwidth (for compatibility with QAM leakage detection, for example), then, for the 8K FFT mode, the leakage level can be defined, for example, by an equation (3):

Leak Level (dBmV/m)=Harmonic Level (dBmV)−
RLharm (dBc)+AF (dB/m)+10 Log (6 MHz/25
kHz)−6 dB             (3)

where AF is the antenna factor and 6 dB is the boosting value of a CPS. According to the DOCSIS 3.1 specification, CPS's are boosted 6 dB relative to the level of the data subcarriers in the OFDM signal.

The sensitivity required to detect a dominant harmonic is achievable. If a leakage level to be calculated is −40 dBmV (10 µV/m) @ 6 MHz, and AF=25 dB/m (e.g. dipole at LTE band 750 MHz), and RLharm=−4.5 dBc (a worst case), the detected harmonic level or sensitivity S of the FFT detector would be:

$S$(dBmV)=−40 dBmV−4.5 dBc−25 dB/m−23.8+6
dB=−87.3 dBmV or −136 dBm

This sensitivity can be achieved with a RBW of about 10 Hz for the FFT detector, and using a threshold level of 10-15 dB below the noise floor, and assuming a typical noise figure for the receiver.

Figure 25A:
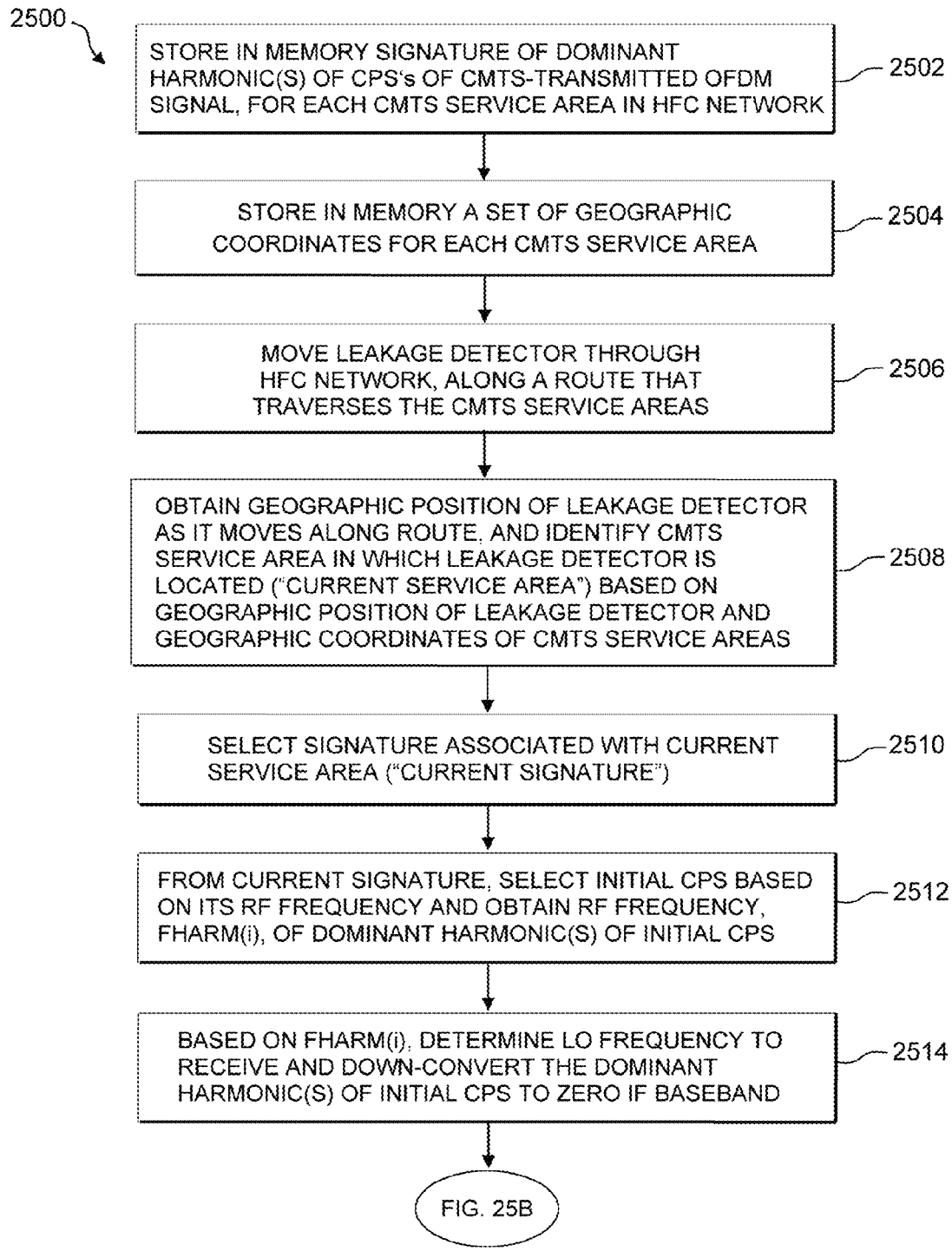
FIGS. 25A and 25B illustrate a flow diagram outlining a preferred method of detecting an OFDM signal leaked from an HFC network by detecting the dominant harmonic(s) of a CPS signal belonging to the OFDM signal.
Figure 25B:
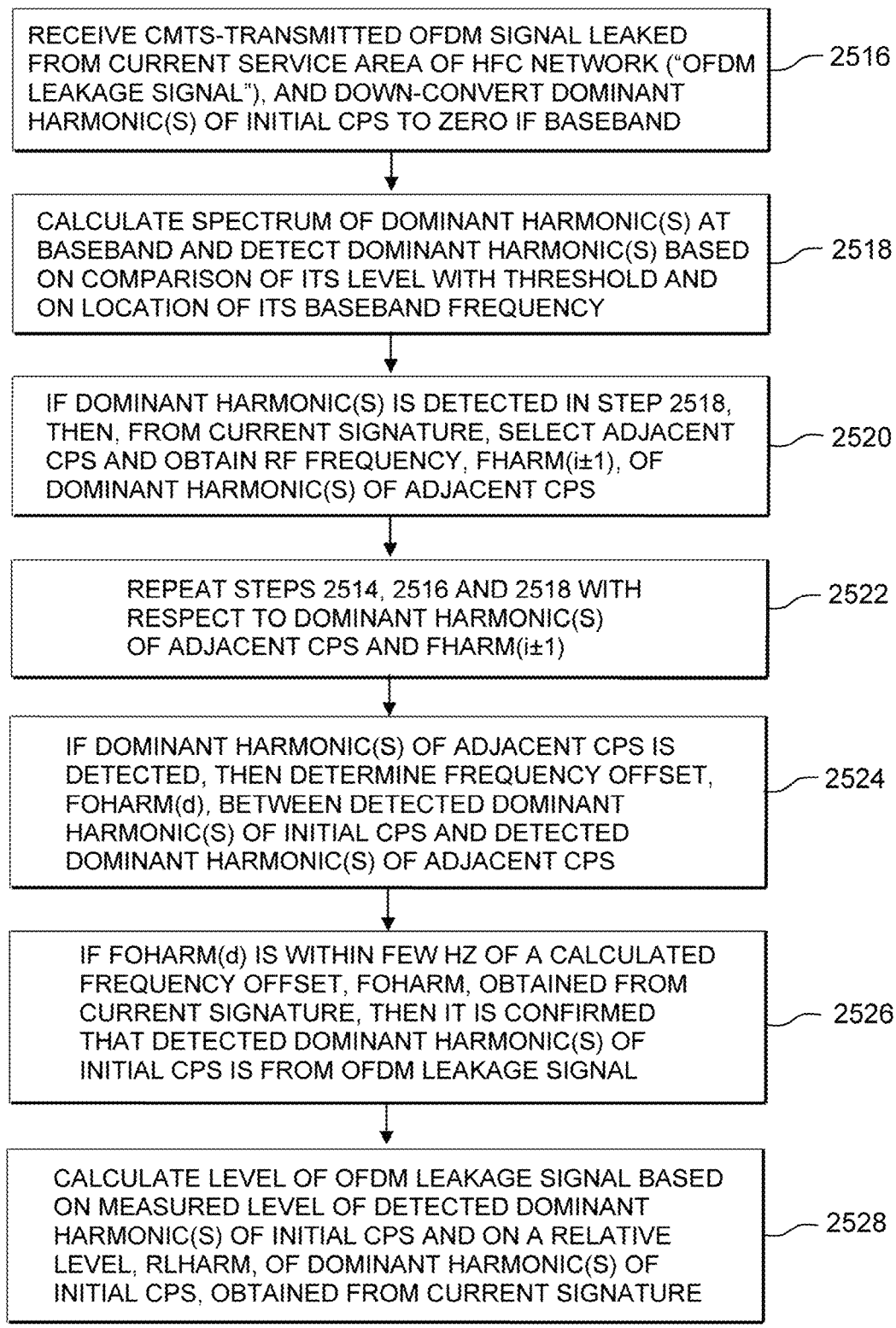

A method of detecting an OFDM signal leak, according to a CPS embodiment of the present invention, will now be described with reference to the flow diagrams of FIGS. 25A and 25B. FIGS. 25A and 25B outline a method 2500 comprising a number of steps for detecting an OFDM leakage signal. In a first step 2502, a CPS signature for each CMTS service area (e.g., service areas 105 in FIG. 1) of an HFC network (e.g., network 103 in FIG. 1) is stored in a flash memory of a leakage detector (e.g., leakage detector 102 in FIG. 16). As previously discussed, each signature contains information about the dominant harmonic(s) of each CPS of an OFDM signal transmitted by a CMTS (e.g., CMTS's 104 in FIG. 1) to a particular service area. In a second step 2504, a set of geographic coordinates of each service area served by the CMTS's is stored in flash memory of the leakage detector. In a third step 2506, the leakage detector is moved through the HFC network, along a route that traverses the service areas served by the CMTS's (see FIG. 1). In a fourth step 2508, a geographic position of the leakage detector (GPS coordinates) is obtained as the detector moves along the route, and the service area in which the detector is located ("current service area") is identified based on the geographic position of the detector and the geographic coordinates of the service areas. In a fifth step 2510, a CPS signature associated with the current service area is selected. In a sixth step 2512, an initial CPS is selected from the current signature based on its RF frequency relative to the frequency of an anticipated leakage signal, and the RF frequency (Fharm i) of the dominant harmonic(s) of the initial CPS (e.g., harmonic 2401 in FIG. 24) is obtained from the current signature. In a seventh step 2514, an LO frequency (e.g., LO frequency 2402 in FIG. 24) of a local oscillator in the leakage detector (e.g., LO 1108 in FIG. 16) is determined based on Fharm i. The LO frequency enables a zero IF down-converter (e.g., down-converter 1112 in FIG. 16) to receive and down-convert to zero IF baseband the dominant harmonic(s) of the initial CPS (see, e.g., band 2403 in FIG. 24).

A description of method 2500 continues with reference to FIG. 25B. In an eighth step 2516, a CMTS-transmitted OFDM signal leaked from the current service area of the HFC network ("OFDM Leakage Signal") is received by the leakage detector (FIG. 16), and the dominant harmonic(s) of the initial CPS is down-converted to zero IF baseband. In a ninth step 2518, the spectrum of the dominant harmonic(s) at baseband is calculated (e.g., by an FFT processor or algorithm), and the dominant harmonic(s) is detected based on a comparison of the measured level of the harmonic(s) with a threshold (e.g., whether the level meets or exceeds a threshold) and based on whether the location of the baseband frequency of the harmonic(s) is within a particular drift band (e.g., within band 2404 in FIG. 24). In a tenth step 2520, if the dominant harmonic(s) of the initial CPS is deemed detected, then an adjacent CPS is selected from the current signature, and the RF frequency, Fharm(i±1), of the dominant harmonic(s) of the adjacent CPS (e.g., harmonic 2405 in FIG. 24) is obtained from the current signature. In an eleventh step 2522, steps 2514, 2516 and 2518 are repeated with respect to the dominant harmonic(s) of the adjacent CPS and Fharm(i±1). In a twelfth step 2524, if the dominant harmonic(s) of the adjacent CPS is deemed detected, then a frequency offset, FOharm(d), between the detected harmonic(s) of the initial CPS and the detected harmonic(s) of the adjacent CPS is determined or measured (e.g., frequency offset 2408 in FIG. 24). In a thirteenth step 2526, if the frequency offset, FOharm(d), is within a few Hz (e.g., one, two or three Hz) of a calculated frequency offset, FOharm(i, i+1), obtained from the current signature, then a decision is made that the detected harmonic(s) of the initial CPS is from the OFDM leakage signal. Lastly, in a fourteenth step 2528, the level of the OFDM leakage signal is calculated based on the measured level of the detected harmonic(s) of the initial CPS and the calculated relative level, RLharm, of the initial CPS harmonic(s). RLharm is obtained from the current signature.

The various functions of the present invention, as described above, may be implemented in hardware, firmware, software, or a combination of these. For example, with respect to hardware, these functions may be implemented in an application specific integrated circuit (ASIC), digital signal process or (DSP), field programmable gate array (FPGA), micro-controller, microprocessor, programmable logic device, general purpose computer, special purpose computer, other electronic device, or a combination of these devices (hereinafter "processor"). If the various functions are implemented in firmware, software, or other computer-executable instructions, then they may be stored on any suitable computer-readable media. Computer-executable instructions may cause a processor to perform the aforementioned functions of the present invention. Computer-executable instructions include data structures, objects, programs, routines, or other program modules accessible and executable by a processor. The computer-readable media may be any available media accessible by a processor. Embodiments of the present invention may include one or more computer-readable media. Generally, computer-readable media include, but are not limited to, random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), flash memory or any other device or component that is capable of providing data or executable instructions accessible by a processor. Certain embodiments recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

While the preferred embodiments of the invention have been particularly described in the specification and illustrated in the drawing, it should be understood that the invention is not so limited. Many modifications, equivalents and adaptations of the invention will become apparent to those skilled in the art without departing from the spirit and scope of the invention, as defined in the appended claims.

What is claimed is:

1. A method of detecting a leak of an orthogonal frequency division multiplexing (OFDM) signal from a hybrid fiber-coax (HFC) network, the HFC network extending over a network area, the OFDM signal including a first continuous pilot subcarrier having a first harmonic, the first harmonic being defined by a pre-determined first frequency, said method comprising the steps of:
  (a) moving a leakage detector through the network area;
  (b) tuning the leakage detector to receive the first harmonic at the pre-determined first frequency of the first harmonic;
  (c) with the leakage detector, receiving over-the-air, at a received first frequency, the first harmonic from the OFDM signal leaked from the HFC network; and
  (d) with the leakage detector, detecting the first harmonic received in step (c), whereby the leak of the OFDM signal is detected based on the detection of the first harmonic.

2. The method of claim 1, further comprising the step of:
  (e) measuring an amplitude of the first harmonic detected in step (d).

3. The method of claim 2, wherein step (d) includes comparing the measured amplitude of the first harmonic with a threshold level to confirm that the first harmonic has been detected.

4. The method of claim 3, wherein step (d) includes determining a spectrum of the first harmonic received in step (c), the spectrum including a noise floor, and wherein the threshold level is below the noise floor of the spectrum.

5. The method of claim 2, further comprising the step of:
  (f) determining a leakage level of the OFDM signal leaked from the HFC network based on the amplitude of the first harmonic measured in step (e).

6. The method of claim 2, wherein the first continuous pilot subcarrier has a total signal energy and the first harmonic is further defined by a relative level, the relative level being a function of amplitude of the first harmonic and the total signal energy of the first continuous pilot subcarrier, said method of claim 2 further comprising the step of:
  (f) determining a leakage level of the OFDM signal leaked from the HFC network based on the amplitude of the first harmonic measured in step (e) and on the relative level.

7. The method of claim 1, further comprising the step of:
  (e) confirming that the first harmonic received in step (c) is from the OFDM signal leaked from the HFC network if the received first frequency is substantially the same as the pre-determined first frequency.

8. The method of claim 1, wherein the OFDM signal includes a second continuous pilot subcarrier having a second harmonic, the second harmonic being defined by a pre-determined second frequency, the pre-determined first frequency of the first harmonic being separated from the pre-determined second frequency by a pre-determined frequency offset, said method of claim 1 further comprising the steps of:

(e) tuning the leakage detector to receive the second harmonic at the pre-determined second frequency of the second harmonic;

(f) with the leakage detector, receiving over-the-air, at a received second frequency, the second harmonic from the OFDM signal leaked from the HFC network;

(g) with the leakage detector, detecting the second harmonic received in step (f);

(h) measuring a frequency offset between the received first frequency of the first harmonic and the received second frequency of the second harmonic; and (i) confirming that the first harmonic received in step (c) is from the OFDM signal leaked from the HFC network if the frequency offset measured in step (h) is substantially the same as the pre-determined frequency offset.

9. The method of claim 1, wherein the leak of the OFDM signal is to be detected in relation to a frequency band of interest, said method of claim 1 further comprising the step of:

(e) selecting the first continuous pilot subcarrier based on the frequency band of interest, such that the pre-determined first frequency of the first harmonic is within or substantially close to the frequency band of interest.

10. The method of claim 9, wherein the frequency band of interest is the long term evolution (LTE) band and step (e) includes selecting the first continuous pilot subcarrier based on the LTE band.

11. The method of claim 1, wherein the network area includes a plurality of service areas including a current service area, the OFDM signal being transmitted through the HFC network to the current service area where it is leaked from the HFC network, the OFDM signal being represented by a signature that specifies the pre-determined first frequency of the first harmonic, each of the service areas being defined by geographic coordinates, and wherein step (a) includes moving the leakage detector through the plurality of service areas, said method of claim 1 further comprising the steps of:

(e) obtaining a geographic position of the leakage detector as it moves into the current service area;

(f) determining that the leakage detector is in the current service area based on the geographic position of the leakage detector and on the geographic coordinates of the service areas;

(g) selecting the signature of the OFDM signal; and (h) identifying from the signature, before step (b), the pre-determined first frequency of the first harmonic.

12. The method of claim 11, wherein the OFDM signal includes a second continuous pilot subcarrier having a second harmonic, the second harmonic being defined by a pre-determined second frequency, the pre-determined first frequency of the first harmonic being separated from the pre-determined second frequency by a pre-determined frequency offset, the signature of the OFDM signal further specifying the pre-determined second frequency or the pre-determined frequency offset, said method of claim 11 further comprising the steps of:

(i) identifying from the signature the pre-determined second frequency of the second harmonic;

(j) tuning the leakage detector to receive the second harmonic at the pre-determined second frequency of the second harmonic;

(k) with the leakage detector, receiving over-the-air, at a received second frequency, the second harmonic from the OFDM signal leaked from the current service area;

(l) with the leakage detector, detecting the second harmonic received in step (k);

(m) measuring a frequency offset between the received first frequency of the first harmonic and the received second frequency of the second harmonic; and (n) confirming that the first harmonic detected in step (d) is from the OFDM signal leaked from the current service area if the frequency offset measured in step (m) is substantially the same as the pre-determined frequency offset.

13. The method of claim 12, wherein the first continuous pilot subcarrier has a total signal energy and the first harmonic is further defined by a relative level, the relative level being a function of amplitude of the first harmonic and the total signal energy of the first continuous pilot subcarrier, the signature of the OFDM signal further specifying the relative level, said method of claim 12 further comprising the steps of:

(o) measuring an amplitude of the first harmonic detected in step (d);

(p) identifying from the signature the relative level; and (q) determining a leakage level of the OFDM signal leaked from the current service area based on the amplitude of the first harmonic measured in step (o) and the relative level identified in step (p).

14. A method of detecting a leak in a hybrid fiber-coax (HFC) network, the HFC network transmitting a plurality of orthogonal frequency division multiplexing (OFDM) signals to a plurality of service areas, respectively, each of the OFDM signals being represented by a signature and each of the service areas being defined by geographic coordinates, the plurality of service areas including a current service area and the plurality of OFDM signals including a current OFDM signal transmitted to the current service area, the current OFDM signal including first and second continuous pilot subcarriers having first and second harmonics, respectively, the first harmonic being defined by a pre-determined first frequency and the second harmonic being defined by a pre-determined second frequency, the signature of the current OFDM signal specifying the pre-determined first and the pre-determined second frequencies, the leak being located in the current service area and emitting the current OFDM signal over-the-air as an OFDM leakage signal, said method comprising the steps of:

(a) moving a leakage detector through the plurality of service areas of the HFC network;

(b) obtaining a geographic position of the leakage detector as it moves into the current service area;

(c) determining that the leakage detector is in the current service area based on the geographic position of the leakage detector and on the geographic coordinates of the service areas;

(d) selecting from the signatures the signature representing the current OFDM signal;

(e) identifying from the selected signature the pre-determined first frequency of the first harmonic;

(f) tuning the leakage detector to receive the first harmonic at the pre-determined first frequency of the first harmonic;

(g) with the leakage detector, receiving over-the-air, at a received first frequency, the first harmonic from the OFDM leakage signal; and (h) with the leakage detector, detecting the first harmonic received in step (g), whereby the OFDM leakage signal is detected based on the detection of the first harmonic.

15. The method of claim 14, further comprising the step of:

(i) measuring an amplitude of the first harmonic detected in step (h).

16. The method of claim 15, wherein step (h) includes comparing the measured amplitude of the first harmonic with a threshold level to confirm that the first harmonic has been detected.

17. The method of claim 14, wherein the first continuous pilot subcarrier of the current OFDM signal has a total signal energy and the first harmonic of the first continuous pilot subcarrier is further defined by a relative level, the relative level being a function of amplitude of the first harmonic and the total signal energy of the first continuous pilot subcarrier, the signature of the current OFDM signal further specifying the relative level, said method of claim 14 further comprising the step of:

(i) measuring an amplitude of the first harmonic detected in step (h);
(j) identifying the relative level from the signature of the current OFDM signal; and
(k) determining a level of the OFDM leakage signal based on the amplitude of the first harmonic measured in step (i) and the relative level identified in step (j).

18. The method of claim 14, wherein the OFDM leakage signal is to be detected in relation to a frequency band of interest, said method of claim 14 further comprising the step of:

(i) selecting the first continuous pilot subcarrier of the current OFDM signal based on the frequency band of interest, such that the pre-determined first frequency of the first harmonic is within or substantially close to the frequency band of interest.

19. The method of claim 14, wherein the pre-determined first frequency of the first harmonic is separated from the pre-determined second frequency of the second harmonic by a pre-determined frequency offset, said method of claim 14 further comprising the steps of:

(i) identifying from the signature of the current OFDM signal the pre-determined second frequency of the second harmonic;
(j) tuning the leakage detector to receive the second harmonic at the pre-determined second frequency of the second harmonic;
(k) with the leakage detector, receiving over-the-air, at a received second frequency, the second harmonic from the OFDM leakage signal;
(l) with the leakage detector, detecting the second harmonic received in step (k);
(m) measuring a frequency offset between the received first frequency of the first harmonic and the received second frequency of the second harmonic; and
(n) confirming that the OFDM leakage signal has been detected if the measured frequency offset is substantially the same as the pre-determined frequency offset.

20. A method of detecting a leak of an orthogonal frequency division multiplexing (OFDM) signal from a current cable modem termination system (CMTS) service area among a plurality of CMTS service areas in a hybrid fiber-coax (HFC) network, the OFDM signal containing a plurality of continuous pilot subcarriers having a plurality of dominant harmonics, respectively, said method comprising the steps of:

(a) providing a leakage detector containing stored therein a signature and geographic coordinates for each of the plurality of CMTS service areas, the signature for the current CMTS service area identifying a radio frequency (RF) frequency and a relative level of the dominant harmonic of each continuous pilot subcarrier contained in the OFDM signal;
(b) moving the leakage detector through the HFC network, along a route that traverses the plurality of CMTS service areas;
(c) obtaining a position of the leakage detector as the leakage detector moves into the current CMTS service area;
(d) determining that the leakage detector is in the current CMTS service area based on the position of the leakage detector and the geographic coordinates of the CMTS service areas;
(e) selecting from the stored signatures the signature for the current CMTS service area;
(f) identifying from the selected signature a first continuous pilot subcarrier, a first dominant harmonic of the first continuous pilot subcarrier, and an RF frequency and a relative level of the first dominant harmonic;
(g) tuning the leakage detector to receive the first dominant harmonic at the RF frequency identified in step (f);
(h) receiving at the leakage detector the OFDM signal leaked from the current CMTS service area, including the first dominant harmonic;
(i) detecting and measuring the level of the first dominant harmonic received in step (h); and
(j) determining the level of the OFDM signal received in step (h) based on the level of the first dominant harmonic measured in step (i) and on the relative level identified in step (f).

21. The method of claim 20, further comprising the steps of:

(k) identifying from the signature selected in step (e) a second continuous pilot subcarrier, a second dominant harmonic of the second continuous pilot subcarrier, an RF frequency of the second dominant harmonic, and a pre-determined frequency offset between the first and the second dominant harmonics;
(l) tuning the leakage detector to receive the second dominant harmonic at the RF frequency of the second dominant harmonic identified in step (k);
(m) receiving at the leakage detector the OFDM signal leaked from the current CMTS service area, including the second dominant harmonic;
(n) detecting the second dominant harmonic received in step (m);
(o) measuring a frequency offset between the first dominant harmonic detected in step (i) and the second dominant harmonic detected in step (n); and
(p) confirming that the first dominant harmonic detected in step (i) is from the OFDM signal leaked from the current CMTS service area if the frequency offset measured in step (o) is substantially the same as the pre-determined frequency offset identified in step (k).

22. A method of detecting a leak of an orthogonal frequency division multiplexing (OFDM) signal from a hybrid fiber-coax (HFC) network, the HFC network extending over a network area, the OFDM signal including first and second continuous pilot subcarriers having first and second harmonics, respectively, the first harmonic being defined by a pre-determined first frequency and the second harmonic being defined by a pre-determined second frequency, the pre-determined first frequency being separated from the pre-determined second frequency by a pre-determined frequency offset, said method comprising the steps of:
- (a) moving a leakage detector through the network area of the HFC network;
- (b) tuning the leakage detector to receive the first and the second harmonics at the pre-determined first and the pre-determined second frequencies, respectively;
- (c) with the leakage detector, receiving over-the-air the OFDM signal, including the first and the second harmonics, leaked from the HFC network;
- (d) with the leakage detector, detecting the first and the second harmonics received in step (c);
- (e) measuring a frequency offset between the first and the second harmonics; and
- (f) confirming that the first harmonic is from the OFDM signal leaked from the HFC network if the frequency offset measured in step (e) is substantially the same as the pre-determined frequency offset.

* * * * *